(12) United States Patent
Aizawa et al.

(10) Patent No.: US 11,933,017 B2
(45) Date of Patent: Mar. 19, 2024

(54) WORK MACHINE

(71) Applicant: KOMATSU LTD., Tokyo (JP)

(72) Inventors: Masanori Aizawa, Tokyo (JP); Kenjiro Shimada, Tokyo (JP)

(73) Assignee: KOMATSU LTD., Tokyo (JP)

( * ) Notice: Subject to any disclaimer, the term of this patent is extended or adjusted under 35 U.S.C. 154(b) by 818 days.

(21) Appl. No.: 16/975,196

(22) PCT Filed: Mar. 27, 2019

(86) PCT No.: PCT/JP2019/013340
§ 371 (c)(1),
(2) Date: Aug. 24, 2020

(87) PCT Pub. No.: WO2020/026521
PCT Pub. Date: Feb. 6, 2020

(65) Prior Publication Data
US 2020/0407939 A1    Dec. 31, 2020

(30) Foreign Application Priority Data
Jul. 31, 2018   (JP) .................... 2018-144231

(51) Int. Cl.
*E02F 3/43*   (2006.01)
*E02F 9/22*   (2006.01)
(Continued)

(52) U.S. Cl.
CPC ............ *E02F 3/435* (2013.01); *E02F 9/2296* (2013.01); *E02F 9/2029* (2013.01); *E02F 9/262* (2013.01); *E02F 9/265* (2013.01)

(58) Field of Classification Search
CPC ..... E02F 3/34; E02F 3/43; E02F 3/435; E02F 9/265; E02F 9/205; E02F 9/2296;
(Continued)

(56) References Cited

U.S. PATENT DOCUMENTS 9,267,837 B2 *   2/2016   Jaeger ................. E02F 9/261
10,954,655 B2 *   3/2021   Ohiwa ................. E02F 9/264
(Continued)

FOREIGN PATENT DOCUMENTS

CN   1738947 A   2/2006
CN   106460372 A   2/2017
(Continued)

OTHER PUBLICATIONS

The Office Action for the corresponding Japanese application No. 2018-144231, dated Jul. 12, 2022.
(Continued)

*Primary Examiner* — Andrew Joseph Rudy
(74) *Attorney, Agent, or Firm* — Global IP Counselors, LLP

(57) ABSTRACT

A work machine loads materials onto a conveyance vehicle. The work machine includes a work implement having a bucket, a topography sensor configured to measure a topography and a controller. The controller determines a target digging path of the bucket based on topographical data indicative of the topography measured by the topography sensor. The controller acquires an actual digging path based on positions of the bucket during digging. The controller is calculates at least one of a viscosity and a hardness of materials based on a difference between the target digging path and the actual digging path.

6 Claims, 24 Drawing Sheets

(51) Int. Cl.
*E02F 9/20* (2006.01)
*E02F 9/26* (2006.01)

(58) Field of Classification Search
CPC .................. G06T 7/0075; G06T 7/602; G06T 2207/10012; G05D 2201/0202; G05D 1/0246; G05D 1/0278; G01G 9/00; G01G 19/00; G01C 21/32
USPC .......................................................... 701/50
See application file for complete search history.

(56) References Cited

U.S. PATENT DOCUMENTS

| | | | |
|---|---|---|---|
| 11,395,452 B2 * | 7/2022 | McDonald | A01C 7/203 |
| 11,530,527 B2 * | 12/2022 | Cohen | G01C 21/3867 |
| 11,788,253 B2 * | 10/2023 | Sano | E02F 3/435 |
| | | | 701/50 |
| 2007/0010925 A1 | 1/2007 | Yokoyama et al. | |
| 2014/0088822 A1 | 3/2014 | Jensen | |
| 2015/0276468 A1 | 10/2015 | Jaeger | |
| 2017/0101761 A1 | 4/2017 | Wu | |
| 2020/0173791 A1 | 6/2020 | Misaki | |
| 2021/0115643 A1 | 4/2021 | Tanaka et al. | |

FOREIGN PATENT DOCUMENTS

| | | |
|---|---|---|
| CN | 207646772 U | 7/2018 |
| JP | 2000-192514 A | 7/2000 |
| JP | 2005-227233 A | 8/2005 |
| JP | 2011-17238 A | 1/2011 |
| JP | 2018-111950 A | 7/2018 |
| JP | 2019-163621 A | 9/2019 |
| JP | 2020-37837 A | 3/2020 |
| WO | 2015/153412 A1 | 10/2015 |
| WO | 2015/194601 A1 | 12/2015 |
| WO | 2019/031551 A1 | 2/2019 |

OTHER PUBLICATIONS

The Office Action for the corresponding Chinese application No. 201980014992.4, dated Oct. 28, 2021.
The International Search Report for the corresponding international application No. PCT/JP2019/013340, dated Jun. 25, 2019.

* cited by examiner

WORK MACHINE

CROSS-REFERENCE TO RELATED APPLICATIONS

This application is a U.S. National stage application of International Application No. PCT/JP2019/013340, filed on Mar. 27, 2019. This U.S. National stage application claims priority under 35 U.S.C. § 119(a) to Japanese Patent Application No. 2018-144231, filed in Japan on Jul. 31, 2018, the entire contents of which are hereby incorporated herein by reference.

BACKGROUND

Field of the Invention

The present invention relates to a work machine.

Background Information

There is work which involves digging materials such as soil and the like by a work machine such as a hydraulic excavator and loading the materials onto a conveyance vehicle such as a dump truck. The conveyance vehicle is loaded with the materials at a predetermined loading position. The conveyance vehicle travels to a predetermined dumping position and dumps the materials at the dumping position. The conveyance vehicle then returns to the loading position and materials are loaded again by the work machine onto the conveyance vehicle.

Conventionally, a technique for performing the above loading work by the work machine with automatic control is known. For example, Japanese Patent Laid-Open No. 2000-192514 indicates that the digging position and the unloading position are previously learned by a controller of the work machine.

SUMMARY

There is a need to easily and accurately acquire the soil qualities (for example, density, viscosity, hardness, etc.) of the materials in order to calculate a target volume of the materials to be dug on the basis of the possible loading weight calculated from the maximum load weight of the materials that can be loaded onto the conveyance vehicle and the weight of the materials already loaded onto the conveyance vehicle.

An object of the present invention is to provide a technique for easily and accurately acquiring the soil quality of a material.

A work machine according to a first aspect loads materials onto a conveyance vehicle. The work machine includes a work implement having a bucket, a topography sensor configured to measure a topography, and a controller. The controller is configured to acquire a digging path of the bucket and measure an weight of the materials held by the bucket. The controller is configured to calculate a volume of the materials held by the bucket, on the basis of topographical data which indicates the topography measured by the topography sensor, and the digging path. The controller is configured to calculate a density of the materials by dividing the measured weight of the materials by the calculated volume of the materials.

A work machine according to a second aspect includes a work implement having a bucket, a topography sensor configured to measure a topography, and a controller. The controller is configured to determine a target digging path of the bucket on the basis of topographical data which indicates the topography measured by the topography sensor, and acquire an actual digging path on the basis of positions of the bucket during digging. The controller is configured to calculate at least one of a viscosity and a hardness of materials on the basis of a difference between the target digging path and the actual digging path.

A method according to a third aspect is executed by a controller for controlling a work machine. The method includes the following processes. A first process is acquiring topographical data which indicates a topography in the vicinity of the work machine. A second process is acquiring a digging path of the bucket of a work implement. A third process is calculating the volume of materials held by the bucket, on the basis of the digging path and the topographical data. A fourth process is measuring the weight of the materials held by the bucket. A fifth process is calculating the density of the materials by dividing the measured weight of the materials by the calculated volume of the materials.

A system according to a fourth aspect controls a work machine. The work machine includes a work implement having a bucket, and a topography sensor which configured to measure a topography. The system includes a controller configured to acquire a digging path of the bucket and measure an weight of materials held by the bucket. The controller is configured to calculate a volume of the materials held by the bucket, on the basis of topographical data which indicates the topography measured by the topography sensor, and the digging path. The controller is configured to calculate a density of the materials by dividing the measured weight of the materials by the calculated volume of the materials.

According to the present invention, a technique can be provided for easily and accurately acquiring the soil qualities of the materials.

DETAILED DESCRIPTION OF EMBODIMENT(S)

Figure 1:
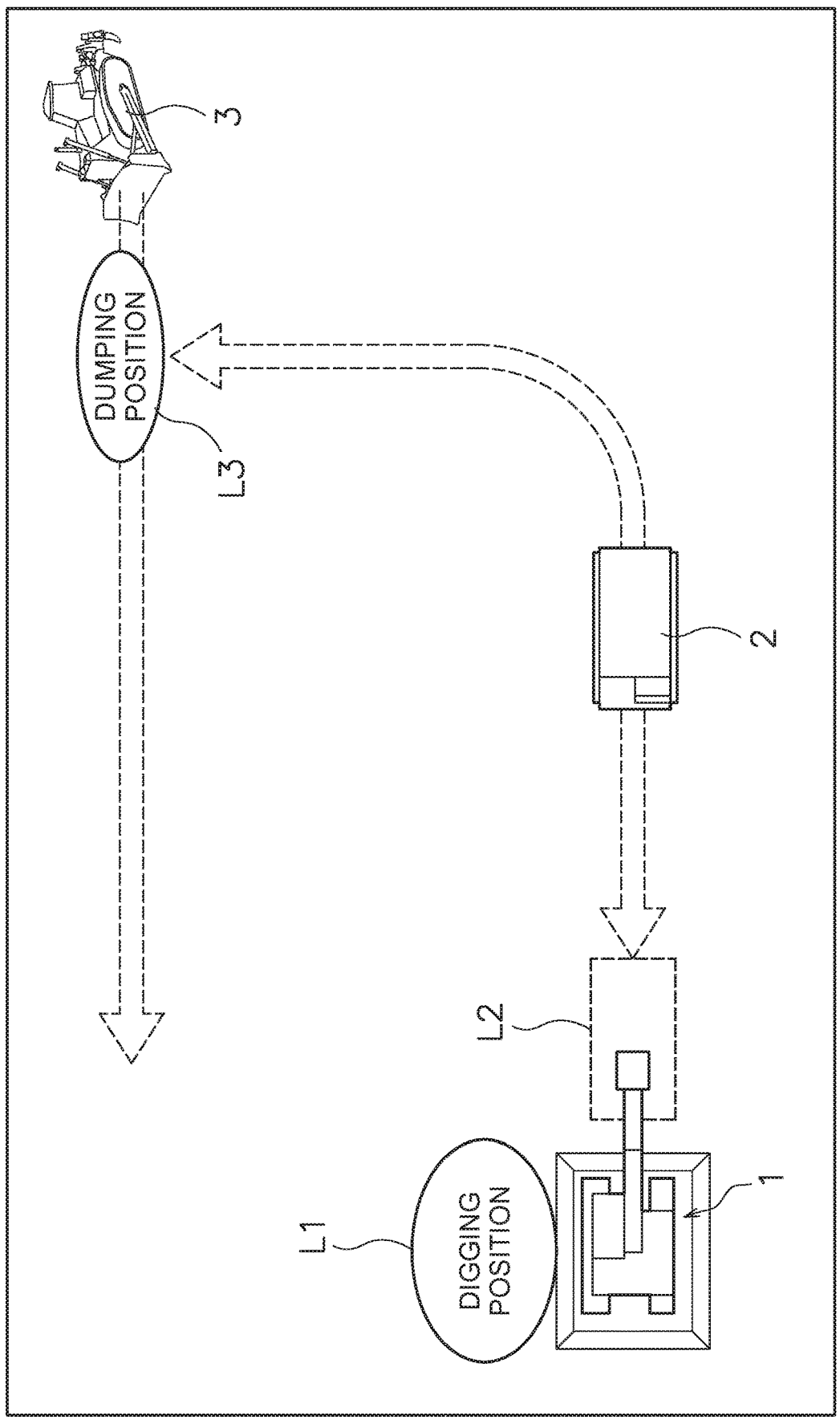
FIG. 1 is a plan view illustrating an example of a work site where a work machine is used.

A control system of a work machine 1 according to an embodiment will now be described with reference to the drawings. FIG. 1 is a plan view illustrating an example of a work site where the work machine 1 is used. The work machine 1 and a conveyance vehicle 2 are disposed at the work site. The work machine 1 performs work in cooperation with the conveyance vehicle 2 with automatic control.

In the present embodiment, the work machine 1 is a hydraulic excavator. The conveyance vehicle 2 is a dump truck. The work machine 1 is disposed beside a predetermined digging position L1 in the work site. The conveyance vehicle 2 travels back and forth between a predetermined loading position L2 and a predetermined dumping position L3 in the work site. The work machine 1 digs the digging position L1 with automatic control and loads materials such as soil and the like as a target to be dug onto the conveyance vehicle 2 that is stopped at the loading position L2. The conveyance vehicle 2 loaded with the materials travels to the dumping position L3 and unloads the materials at the dumping position L3. Another work machine 3 such as a bulldozer is disposed at the dumping position L3 and spreads the materials unloaded at the dumping position L3. The conveyance vehicle 2 that has unloaded the materials travels to the loading position L2 and the work machine 1 loads again the materials onto the conveyance vehicle 2 that is stopped at the loading position L2. The materials of the digging position L1 are transported to the dumping position L3 by repeating the above work.

Figure 2:
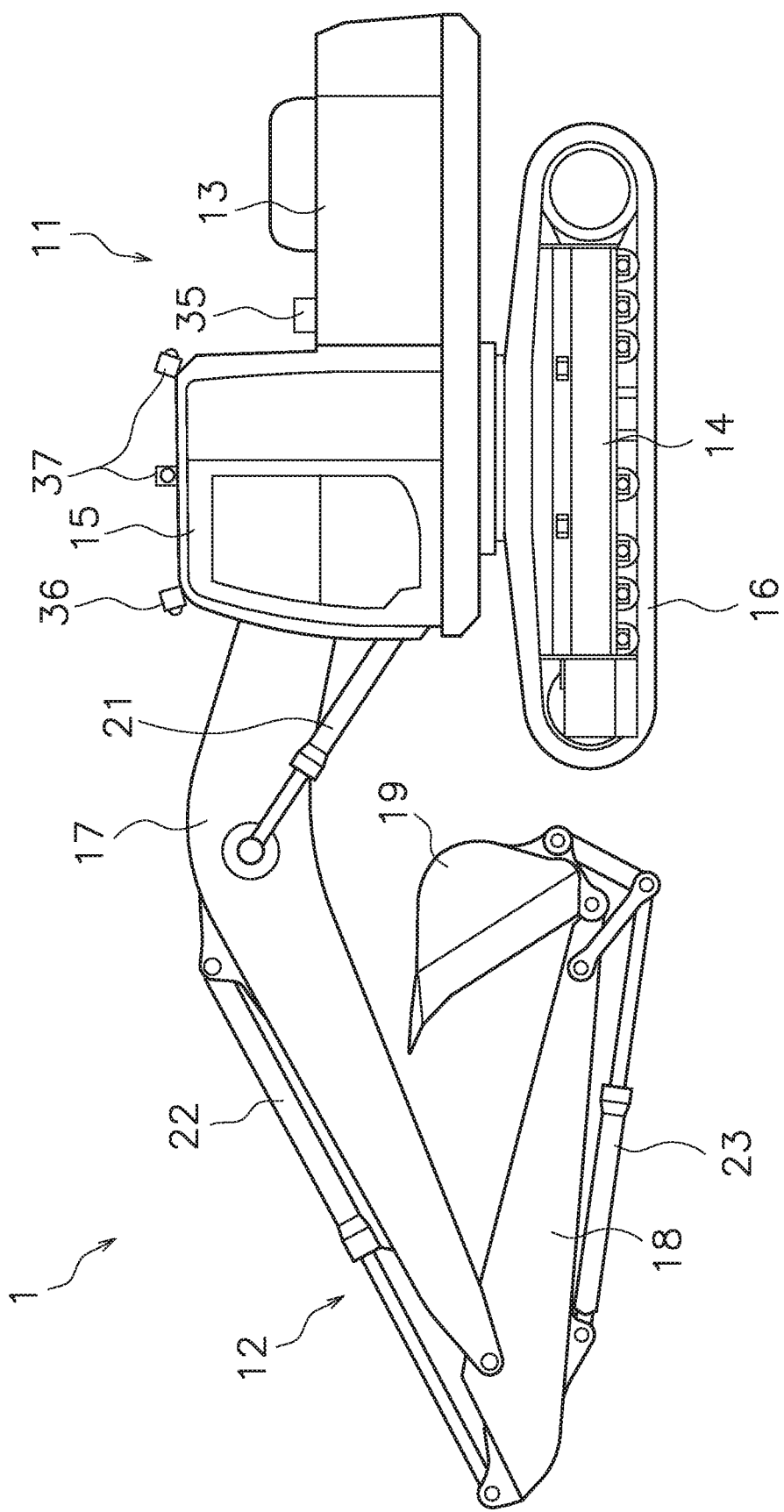
FIG. 2 is a side view of the work machine.

FIG. 2 is a side view of the work machine 1. As illustrated in FIG. 2, the work machine 1 includes a vehicle body 11 and a work implement 12. The vehicle body 11 includes a rotating body 13 and a traveling body 14. The rotating body 13 is rotatably attached to the traveling body 14. A cab 15 is disposed on the rotating body 13. However, the cab 15 may be omitted. The traveling body 14 includes crawler belts 16. The crawler belts 16 are driven by driving force from an engine 24 described later, whereby the work machine 1 travels.

The work implement 12 is attached to the front part of the vehicle body 11. The work implement 12 includes a boom 17, an arm 18, and a bucket 19. The boom 17 is attached to the rotating body 13 so as to allow movement in the up and down direction. The arm 18 is movably attached to the boom 17. The bucket 19 is movably attached to the arm 18. The work implement 12 includes a boom cylinder 21, an arm cylinder 22, and a bucket cylinder 23. The boom cylinder 21, the arm cylinder 22, and the bucket cylinder 23 are hydraulic cylinders and are driven by hydraulic fluid from a hydraulic pump 25 described later. The boom cylinder 21 actuates the boom 17. The arm cylinder 22 actuates the arm 18. The bucket cylinder 23 actuates the bucket 19.

Figure 3:
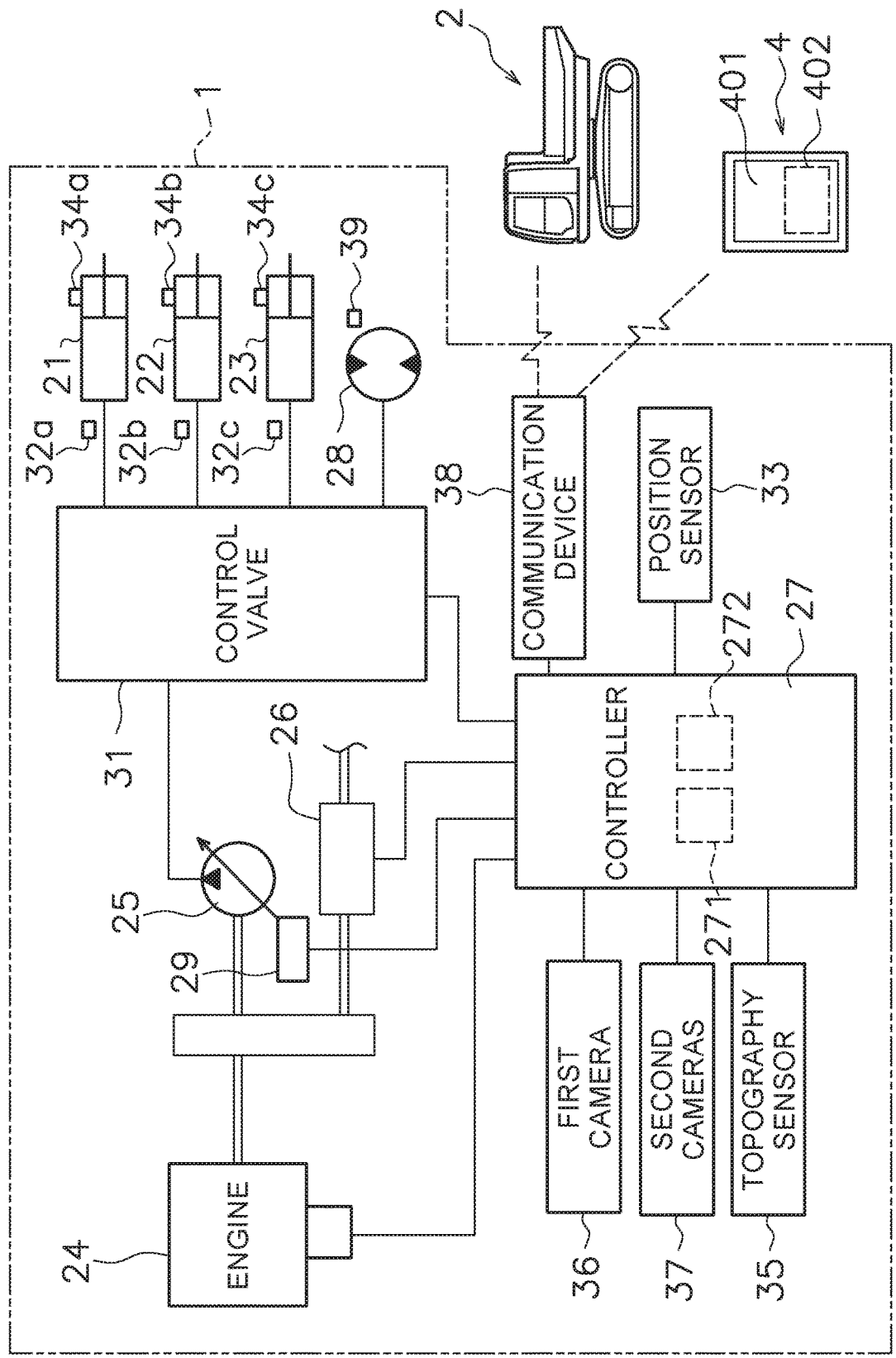
FIG. 3 is a block diagram illustrating a configuration of the work machine.

FIG. 3 is a block diagram illustrating a configuration of a control system of the work machine 1. As illustrated in FIG. 3, the work machine 1 includes an engine 24, a hydraulic pump 25, a power transmission device 26, and a controller 27.

The engine 24 is controlled by command signals from the controller 27. The hydraulic pump 25 is driven by the engine 24 to discharge hydraulic fluid. The hydraulic fluid discharged from the hydraulic pump 25 is supplied to the boom cylinder 21, the arm cylinder 22, and the bucket cylinder 23.

The work machine 1 includes a rotation motor 28. The rotation motor 28 is a hydraulic motor and is driven by hydraulic fluid from the hydraulic pump 25. The rotation motor 28 rotates the rotating body 13. While only one hydraulic pump 25 is illustrated in FIG. 2, a plurality of hydraulic pumps may be provided.

A pump control device 29 is connected to the hydraulic pump 25. The hydraulic pump 25 is a variable displacement pump. The pump control device 29 controls the inclination angle of the hydraulic pump 25. The pump control device 29 includes, for example, an electromagnetic valve and is controlled by command signals from the controller 27. The controller 27 controls the displacement of the hydraulic pump 25 by controlling the pump control device 29.

The hydraulic pump 25, the cylinders 21 to 23, and the rotation motor 28 are connected to each other by means of a hydraulic circuit via a control valve 31. The control valve 31 is controlled by command signals from the controller 27. The control valve 31 controls the flow rate of the hydraulic fluid supplied from the hydraulic pump 25 to the cylinders 21 to 23 and the rotation motor 28. The controller 27 controls the operation of the work implement 12 by controlling the control valve 31. The controller 27 also controls the rotation of the rotating body 13 by controlling the control valve 31.

The power transmission device 26 transmits driving force from the engine 24 to the traveling body 14. The power transmission device 26 may be, for example, a torque converter or a transmission having a plurality of transmission gears. Alternatively, the power transmission device 26 may be another type of transmission such as a hydro static transmission (HST) or a hydraulic mechanical transmission (HMT).

The controller 27 is programmed so as to control the work machine 1 based on acquired data. The controller 27 causes the work machine 1 to travel by controlling the engine 24, the traveling body 14, and the power transmission device 26. The controller 27 causes the work implement 12 to operate by controlling the engine 24, the hydraulic pump 25, and the control valve 31.

The controller 27 includes a processor 271 such as a CPU or GPU, and a storage device 272. The processor 271 performs processing for the automatic control of the work machine 1. The storage device 272 includes a memory such as RAM or a ROM, and an auxiliary storage device such as a hard disk drive (HDD) or a solid state drive (SSD). The storage device 272 stores data and programs for the automatic control of the work machine 1.

The work machine 1 includes load sensors 32a to 32c. The load sensors 32a to 32c detect a load applied to the work implement 12 and output load data indicative of the load. In the present embodiment, the load sensors 32a to 32c are hydraulic pressure sensors and detect the hydraulic pressures of the cylinders 21 to 23, respectively. The load data indicates the hydraulic pressures of the cylinders 21 to 23. The controller 27 is communicably connected to the load sensors 32a to 32c by wire or wirelessly. The controller 27 receives the load data from the load sensors 32a to 32c.

The work machine 1 includes a position sensor 33, work implement sensors 34a to 34c, and a rotation angle sensor 39. The position sensor 33 detects the position of the work machine 1 and outputs position data indicative of the position of the work machine 1. The position sensor 33 includes a global navigation satellite system (GNSS) receiver and an inertial measurement unit (IMU). The GNSS receiver is, for example, a receiver for a global positioning system (GPS). The position data includes data indicative of the position of the work machine 1 output by the GNSS receiver and data indicative of the attitude of the vehicle body 11 output by the IMU. The attitude of the vehicle body 11 includes an angle (pitch angle) with respect to the horizontal in the longitudinal direction of the work machine 1 and an angle (roll angle) with respect to the horizontal in the lateral direction of the work machine 1.

The work implement sensors 34a to 34c detect the attitude of the work implement 12 and output attitude data indicative of the attitude of the work implement 12. The work implement sensors 34a to 34c are, for example, stroke sensors that detect the stroke amounts of the cylinders 21 to 23. The attitude data of the work implement 12 includes the stroke amounts of the cylinders 21 to 23. Alternatively, the work implement sensors 34a to 34c may be other sensors such as sensors that detect the rotation angles of the boom 17, the arm 18, and the bucket 19, respectively. The rotation angle sensor 39 detects the rotation angle of the rotating body 13 with respect to the traveling body 14 and outputs rotation angle data indicative of the rotation angle.

The controller 27 is communicably connected to the position sensor 33, the work implement sensors 34a to 34c, and the rotation angle sensor 39 by wire or wirelessly. The controller 27 receives the position data of the work machine 1, the attitude data of the work implement 12, and the rotation angle data from the position sensor 33, the work implement sensors 34a to 34c, and the rotation angle sensor 39, respectively. The controller 27 calculates the blade tip position of the bucket 19 within the work implement 12 from the position data, the attitude data, and the rotation angle data. For example, the position data of the work machine 1 indicates the global coordinates of the position sensor 33. The controller 27 calculates the global coordinates of the blade tip position of the bucket 19 from the global coordinates of the position sensor 33 based on the attitude data of the work implement 12 and the rotation angle data.

The work machine 1 includes a topography sensor 35. The topography sensor 35 measures a topography in a periphery of the work machine 1 and outputs topography data indicative of the topography measured by the topography sensor 35. In the present embodiment, the topography sensor 35 is attached to a side part of the rotating body 13. The topography sensor 35 measures the topography located to the side of the rotating body 13. The topography sensor 35 is, for example, a laser imaging detection and ranging (LIDAR) device. The LIDAR device measures the distances to a plurality of measurement points on the topography by irradiating a laser and measuring the reflected light thereof. The topography data indicates the positions of the measurement points with respect to the work machine 1.

The work machine 1 includes a first camera 36 and a plurality of second cameras 37. The first camera 36 faces forward from the rotating body 13 and is attached to the rotating body 13. The first camera 36 captures toward the front of the rotating body 13. The first camera 36 is a stereo camera. The first camera 36 outputs first image data indicative of captured moving images.

The plurality of second cameras 37 are attached to the rotating body 13 and facing left, right, and rear from the rotating body 13. The second cameras 37 output second image data indicative of captured moving images. The second cameras 37 may be single-lens cameras. Alternatively, the second cameras 37 may be stereo cameras in the same way as the first camera 36. The controller 27 is communicably connected to the first camera 36 and the second cameras 37 by wire or wirelessly. The controller 27 receives the first image data from the first camera 36. The controller 27 receives the second image data from the second cameras 37.

The work machine 1 includes a communication device 38. The communication device 38 performs data communication with a device outside the work machine 1. The communication device 38 performs data communication with a remote computer apparatus 4 outside the work machine 1. The remote computer apparatus 4 may be disposed at the work site. Alternatively, the remote computer apparatus 4 may be disposed at a management center remote from the work site. The remote computer apparatus 4 includes a display 401 and an input device 402.

The display 401 displays images related to the work machine 1. The display 401 displays images corresponding to signals received from the controller 27 via the communication device 38. The input device 402 is operated by an operator. The input device 402 may include, for example, a touch screen or may include hardware keys. The remote computer apparatus 4 transmits signals indicative of commands input by the input device 402, to the controller 27 via the communication device 38. The communication device 38 performs data communication with the conveyance vehicle 2.

Figure 4:
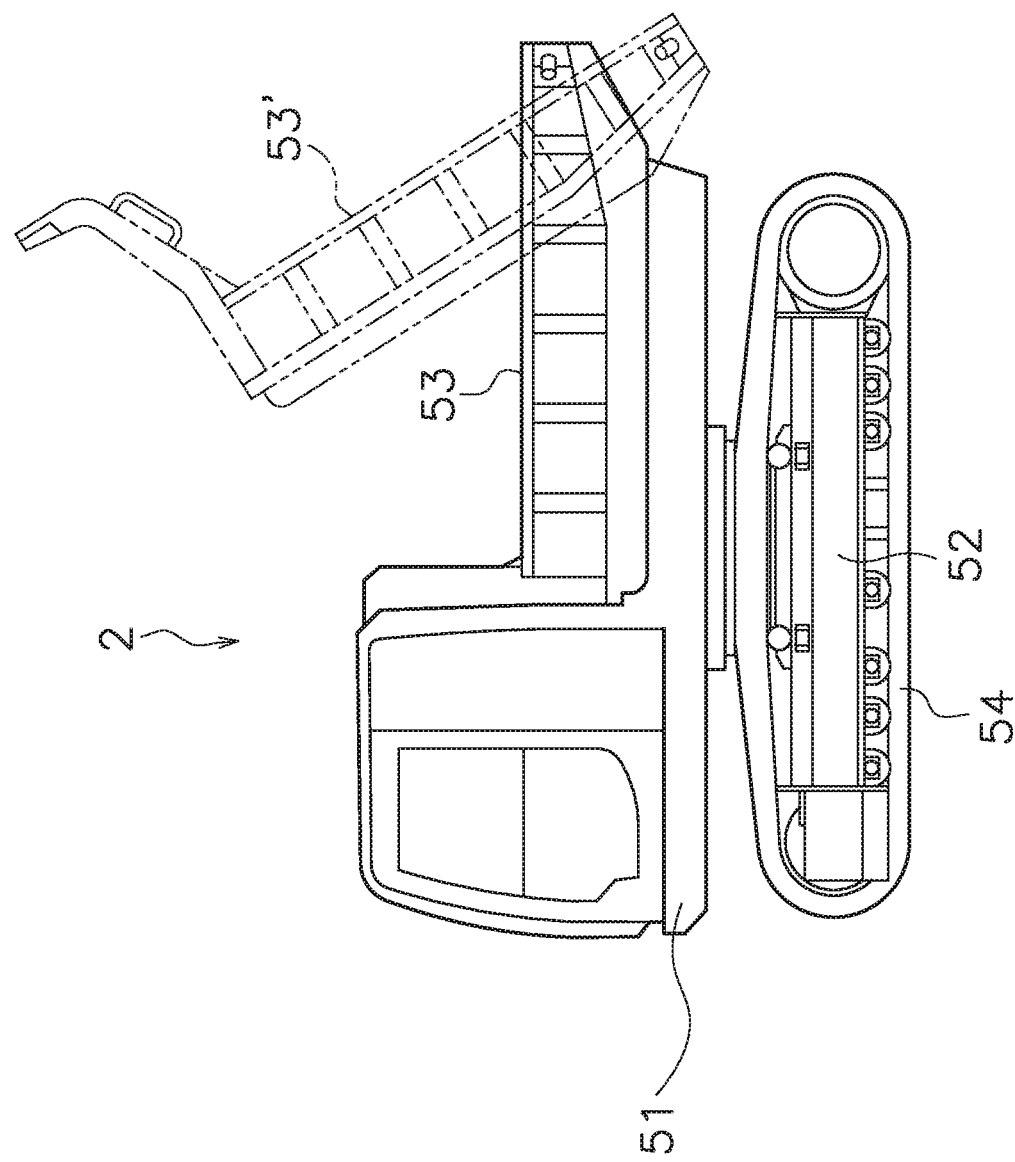
FIG. 4 is a side view of a conveyance vehicle.

FIG. 4 is a side view of the conveyance vehicle 2. As illustrated in FIG. 4, the conveyance vehicle 2 includes a vehicle body 51, a traveling body 52, and a bed 53. The vehicle body 51 is supported by the traveling body 52. The traveling body 52 includes crawler belts 54. The crawler belts 54 are driven by the driving force from an engine 55 described later, whereby the conveyance vehicle 2 travels. The bed 53 is supported by the vehicle body 51. The bed 53 is configured to move between a dumping attitude and a conveying attitude. In FIG. 4, the bed 53 indicated by a solid line indicates the position of the bed 53 in the conveying attitude. The bed 53 indicated by a chain double-dashed line indicates the position of the bed 53 in the dumping attitude. In the conveying attitude, the bed 53 is disposed approximately horizontally. In the dumping attitude, the bed 53 is inclined with respect to the conveying attitude.

Figure 5:
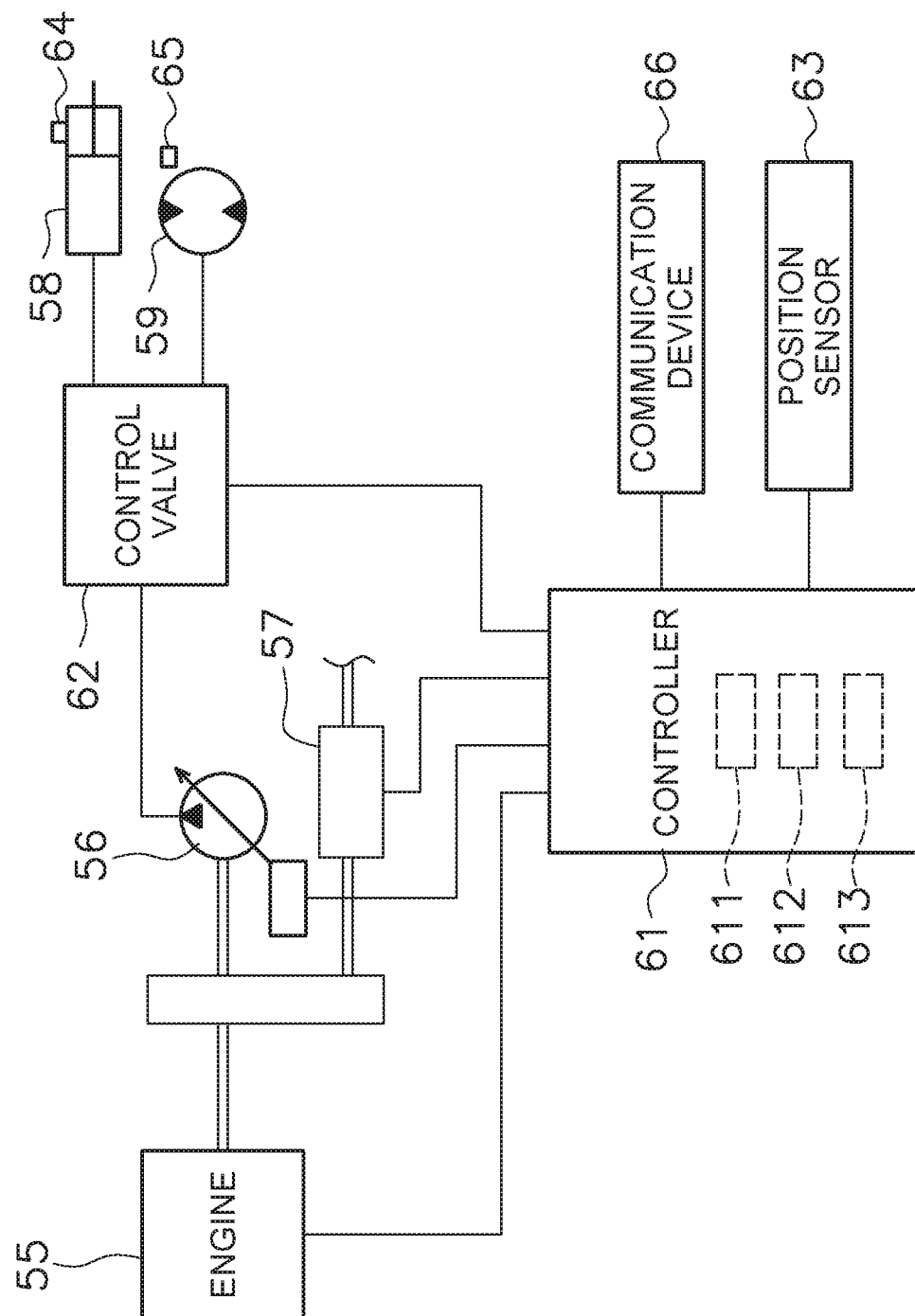
FIG. 5 is a block diagram illustrating a configuration of the conveyance vehicle.

FIG. 5 is a block diagram illustrating a configuration of a control system of the conveyance vehicle 2. The conveyance vehicle 2 includes an engine 55, a hydraulic pump 56, a power transmission device 57, a lift cylinder 58, a rotation motor 59, a controller 61, and a control valve 62. The controller 61 includes a processor 611, a volatile storage unit 612, and a non-volatile storage unit 613.

The engine 55, the hydraulic pump 56, the power transmission device 57, the controller 61, and the control valve 62 have the same configurations as the engine 24, the hydraulic pump 25, the power transmission device 26, the controller 27, and the control valve 31 of the work machine 1, respectively. Therefore, detailed explanations thereof are omitted.

The lift cylinder 58 is a hydraulic cylinder. The rotation motor 59 is a hydraulic motor. The hydraulic fluid discharged from the hydraulic pump 56 is supplied to the lift cylinder 58 and the rotation motor 59. The lift cylinder 58 and the rotation motor 59 are driven by hydraulic fluid from the hydraulic pump 56. The lift cylinder 58 raises and lowers the bed 53. Consequently, the attitude of the bed 53 is switched between the conveying attitude and the dumping attitude. The rotation motor 59 causes the vehicle body 51 to rotate with respect to the traveling body 52. The controller 61 controls the lift cylinder 58 by means of the control valve 62 thereby controlling the operation of the bed 53. In addition, the controller 61 controls the rotation motor 59 by means of the control valve 62 thereby controlling the rotation of the vehicle body 51.

The conveyance vehicle 2 includes a position sensor 63, a bed sensor 64, and a rotation angle sensor 65. The position sensor 63 outputs position data in the same way as the position sensor 33 of the work machine 1. The position data includes data indicative of the position of the conveyance vehicle 2 and data indicative of the attitude of the vehicle body 51.

The bed sensor 64 detects the attitude of the bed 53 and outputs bed data indicative of the attitude of the bed 53. The bed sensor 64 is, for example, a stroke sensor that detects the stroke amount of the lift cylinder 58. The bed data includes the stroke amount of the lift cylinder 58. Alternatively, the bed sensor 64 may be another type of sensor such as a sensor that detects the inclination angle of the bed 53. The rotation angle sensor 65 detects the rotation angle of the vehicle body 51 with respect to the traveling body 52 and outputs rotation angle data indicative of the rotation angle.

The controller 61 is communicably connected to the position sensor 63, the bed sensor 64, the rotation angle sensor 65 by wire or wirelessly. The controller 61 receives the position data, the bed data, and the rotation angle data from the position sensor 63, the bed sensor 64, and the rotation angle sensor 65, respectively.

The conveyance vehicle 2 includes a communication device 66. The controller 61 of the conveyance vehicle 2 performs data communication with the controller 27 of the work machine 1 via the communication device 66. The controller 61 of the conveyance vehicle 2 transmits the position data, the bed data, and the rotation angle data of the conveyance vehicle 2 via the communication device 66. The controller 27 of the work machine 1 receives the position data, the bed data, and the rotation angle data of the conveyance vehicle 2 via the communication device 38. The controller 27 of the work machine 1 stores vehicle dimension data indicative of the dispositions and the dimensions of the vehicle body 51 and the bed 53 of the conveyance vehicle 2. The controller 27 calculates the position of the bed 53 from the position data, the bed data, the rotation angle data, and the vehicle dimension data of the conveyance vehicle 2.

Next, the processing of the automatic control mode executed by the controller 27 of the work machine 1 will be described. In the automatic control mode, the controller 27 controls the work machine 1 so that the abovementioned digging and loading work is performed automatically. FIGS. 6 to 9 are flowcharts illustrating the processing of the automatic control mode.

The automatic control mode includes a loading mode and modes other than the loading mode. Another mode in the present embodiment is a standby mode. In the standby mode, the controller 27 causes the work machine 1 to wait on standby until the conveyance vehicle 2 has arrived at the loading position L2 and stopped. In addition to the standby mode, the other modes may include modes such as a mode for gathering fallen materials, a digging mode for digging another region and further increasing the materials, or the like.

Figure 6:
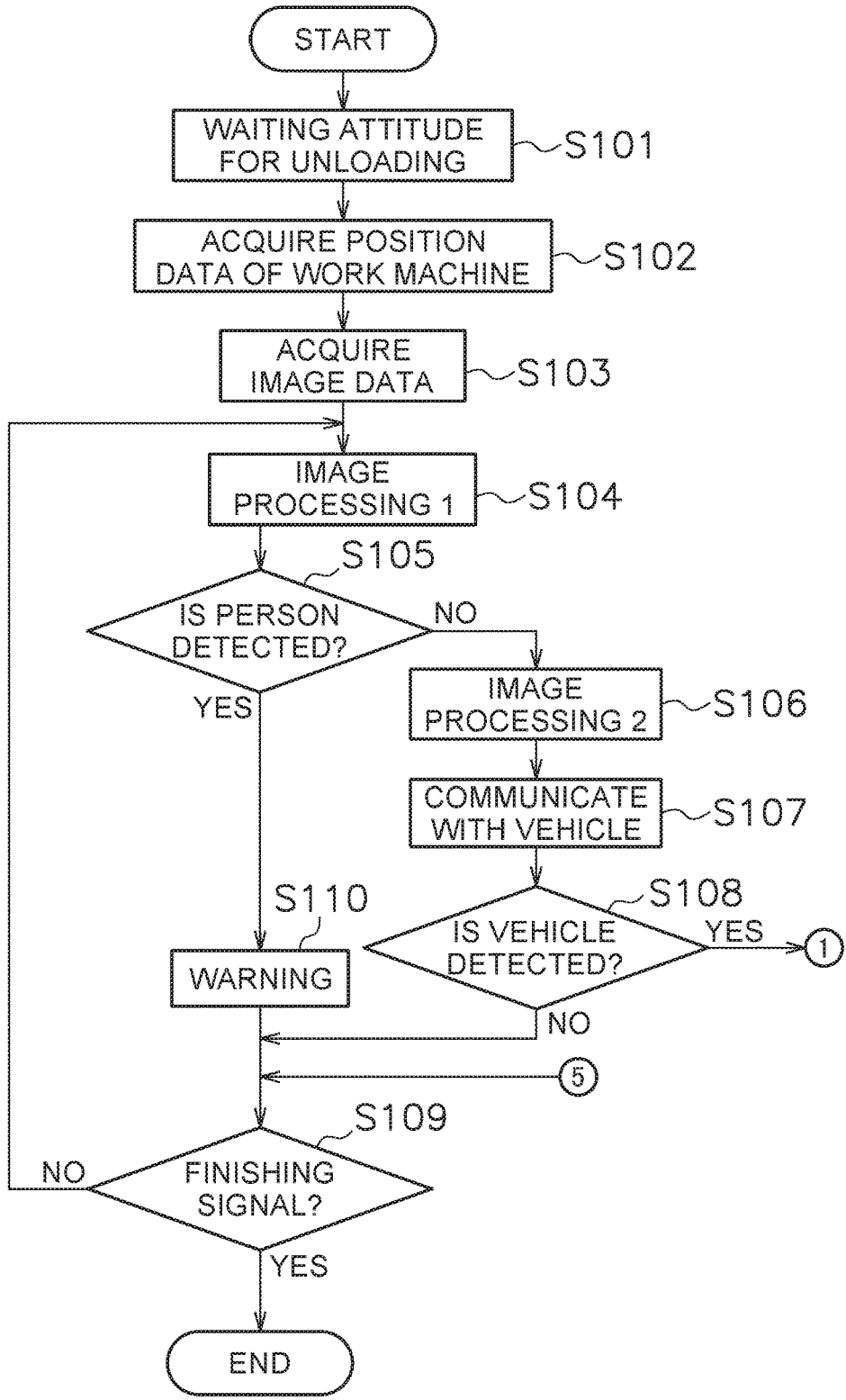
FIG. 6 is a flowchart illustrating processes in a standby mode.
Figure 7:
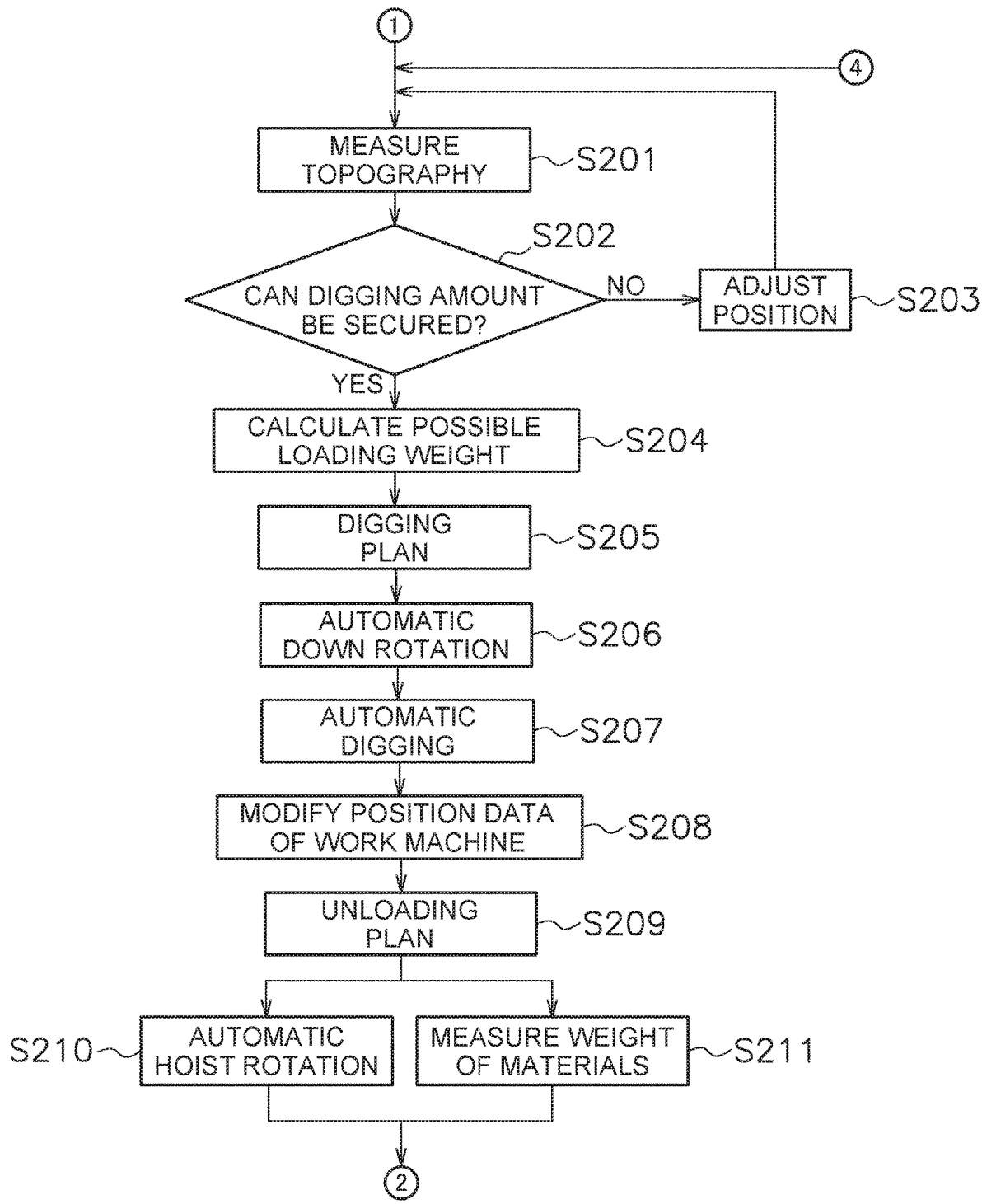
FIG. 7 is a flowchart illustrating processes in a loading mode.
Figure 8:
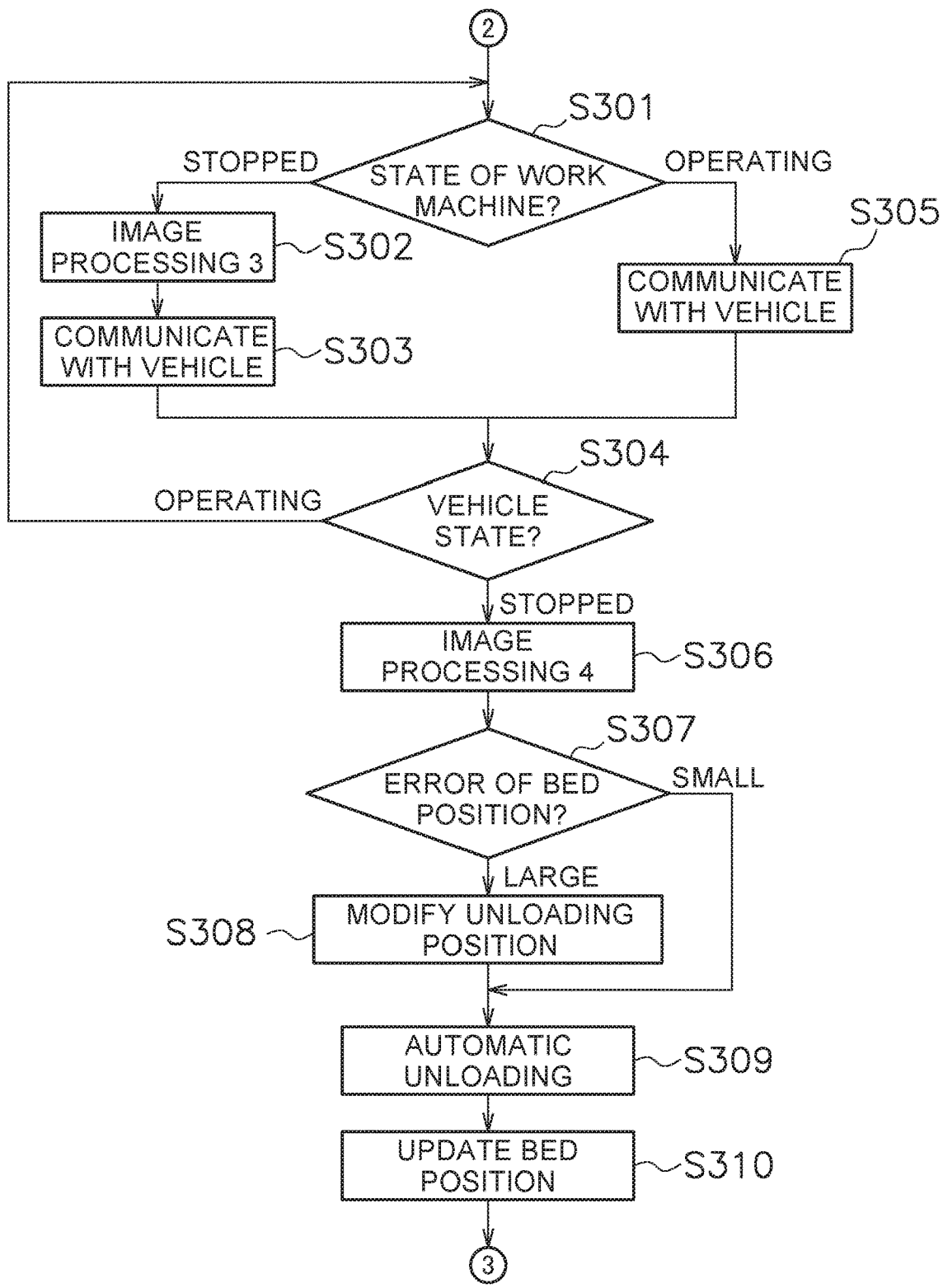
FIG. 8 is a flowchart illustrating processes in the loading mode.
Figure 9:
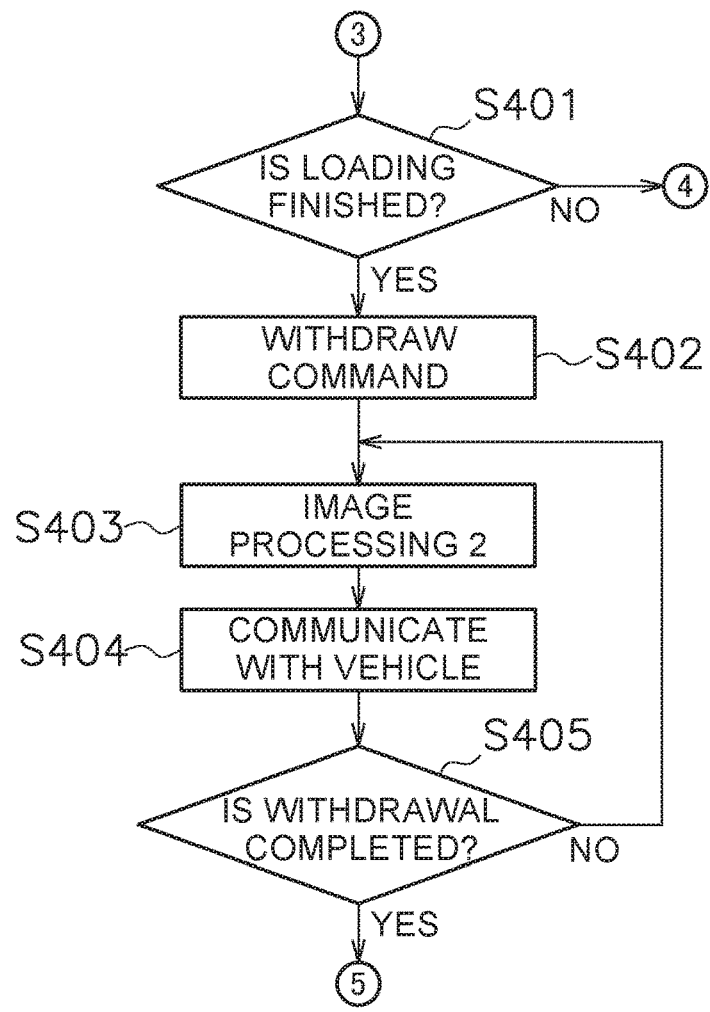
FIG. 9 is a flowchart illustrating processes in the in loading mode.

In the loading mode, the controller 27 causes the work machine 1 to operate so as to perform loading work onto the conveyance vehicle 2 when the conveyance vehicle 2 is stopped at the loading position L2. FIG. 6 is a flowchart illustrating processes in the standby mode. FIGS. 7 to 9 are flowcharts illustrating processes in the loading mode. FIGS. 10 to 18 are plan views schematically illustrating conditions of the work site during the automatic control mode.

Figure 10:
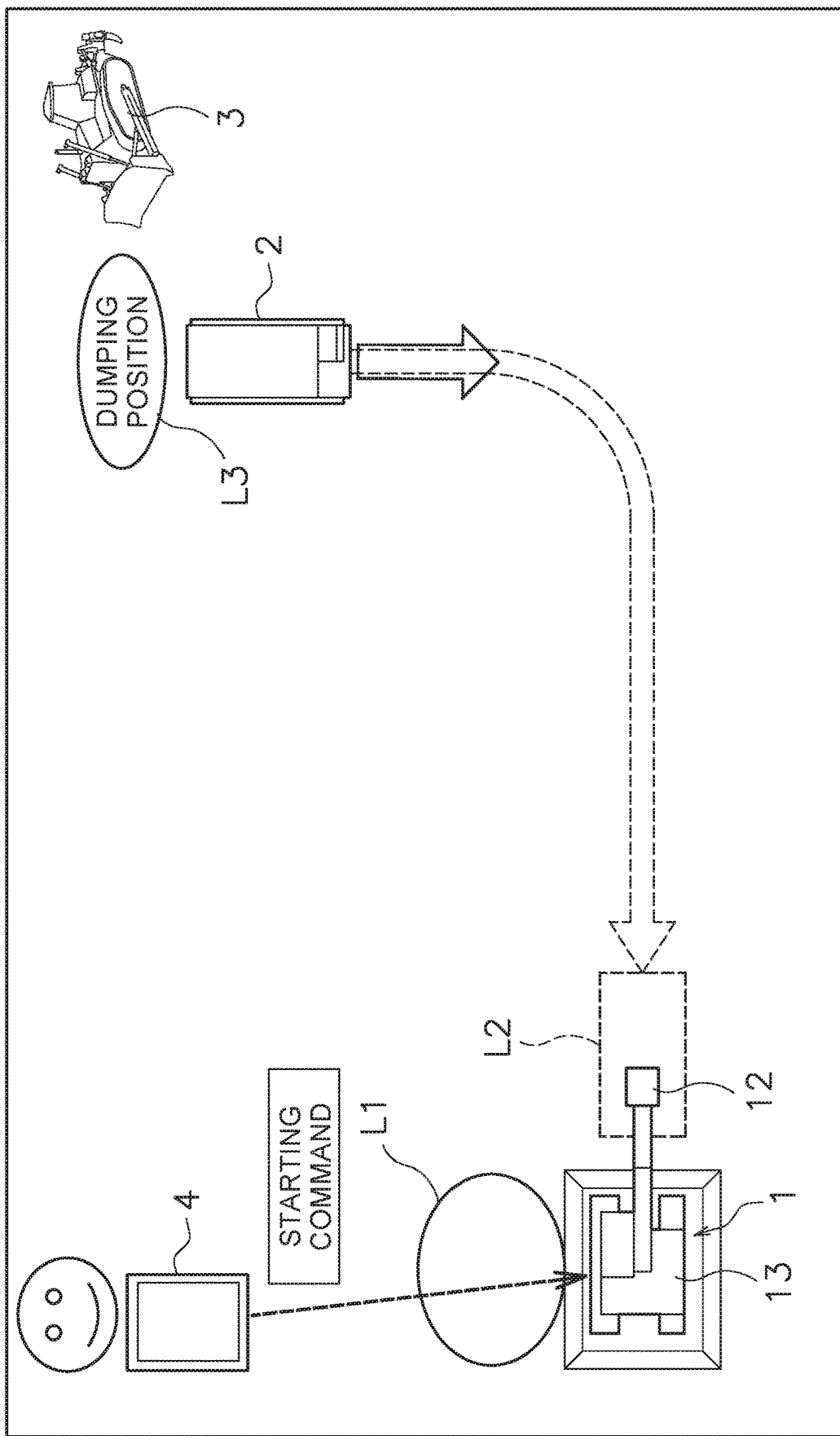
FIG. 10 is a plan view schematically illustrating conditions of the work site during an automatic control mode.

When receiving a starting command of the automatic control mode, the controller 27 starts the engine 24 of the work machine 1 and executes the processes of the standby mode illustrated in FIG. 6. As illustrated in FIG. 10, the starting command of the automatic control mode is output from the abovementioned remote computer apparatus 4 due to, for example, the operator operating the input device 402 of the remote computer apparatus 4. The controller 27 receives the starting command through the communication device 38. In addition, the conveyance vehicle 2 also receives the starting command of the automatic control mode. Upon receiving the starting command of the automatic control mode, the conveyance vehicle 2 starts moving toward the loading position L2.

As illustrated in FIG. 6, in step S101, the controller 27 causes the work machine 1 to wait on standby in a waiting attitude for unloading. That is, in the standby mode, the controller 27 maintains the work implement 12, the rotating body 13, and the traveling body 14 in the waiting attitude for unloading. As illustrated in FIG. 10, in the waiting attitude for unloading, the work implement 12 is disposed so as to face the loading position L2. That is, in the waiting attitude for unloading, the front of the rotating body 13 faces the loading position L2. In addition, in the waiting attitude for unloading, the bucket 19 is disposed in a position higher than the height of the bed 53 of the conveyance vehicle 2.

In step S102, the controller 27 acquires the position of the work machine 1. Here, the controller 27 acquires the position data of the work machine 1, the attitude data of the work implement 12, and the rotation angle data from the position sensor 33, the work implement sensors 34a to 34c, and the rotation angle sensor 39, respectively. The controller 27 calculates the blade tip position of the bucket 19 within the work implement 12 from the position data, the attitude data, and the rotation angle data.

In step S103, the controller 27 acquires image data. Here, the controller 27 acquires the first image data indicative of moving images in front of the rotating body 13 from the first camera 36. The controller 27 acquires the second image data indicative of moving images to the both sides and to the rear side from the rotating body 13, from the second cameras 37. The first camera 36 and the second cameras 37 constantly capture images to generate the first image data and the second image data at least during the execution of the automatic control mode. The controller 27 acquires the first image data and the second image data in real time from the first camera 36 and the second cameras 37 at least during the execution of the automatic control mode.

In step S104, the controller 27 executes image processing 1. The image processing 1 detects the presence of a person in the periphery of the work machine 1 with image recognition technology based on the first image data and the second image data. Therefore, the first camera 36 and the second cameras 37 correspond to a person detection device that detects the presence of a person in a region in the periphery of the work machine 1.

Figure 19:
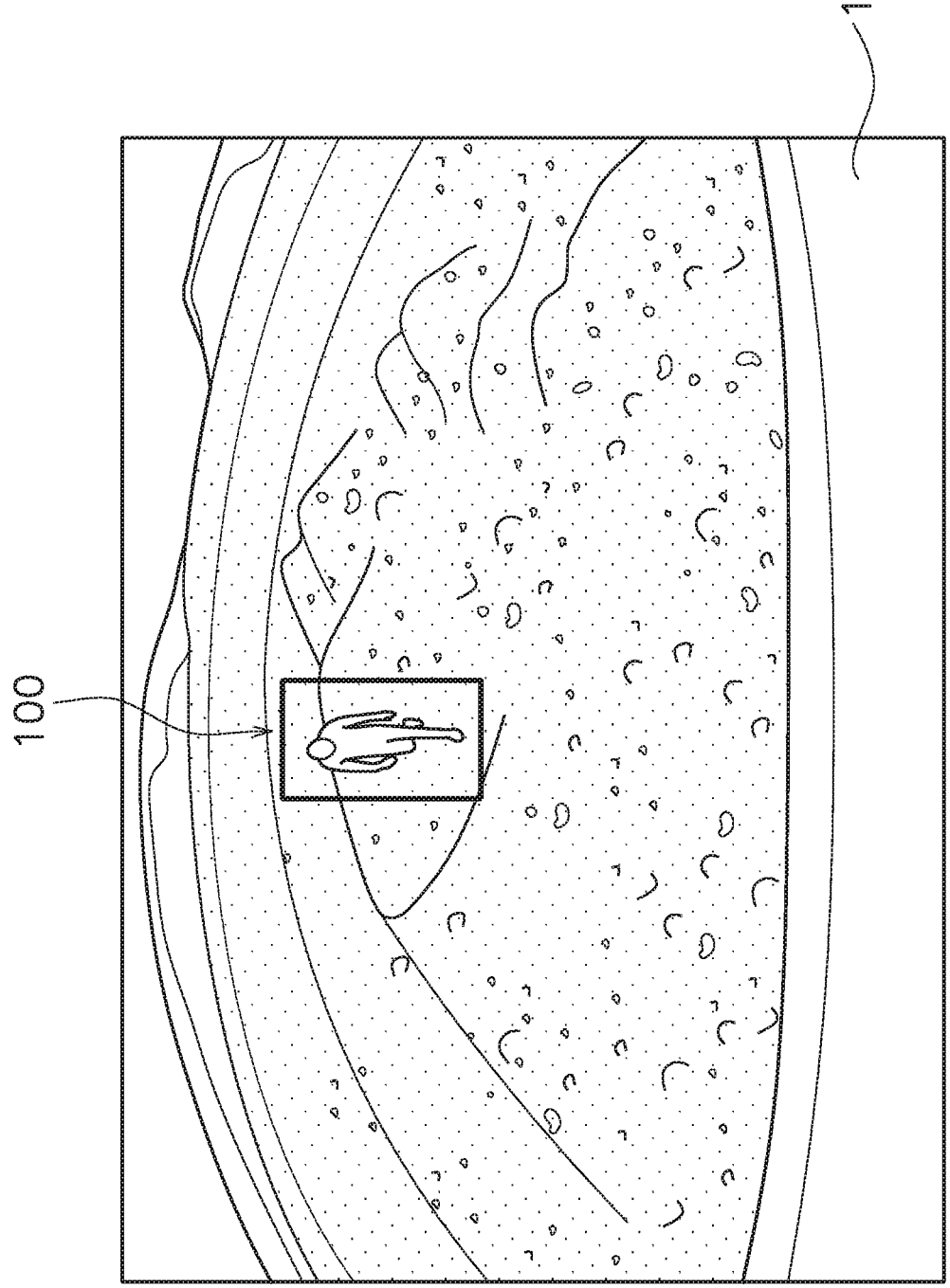
FIG. 19 is a view illustrating an example of an image captured by a first camera or a second camera.

The controller 27 detects the presence of a person in the images indicated by the first image data and the second image data by using, for example, image recognition technology that uses artificial intelligence (AI). FIG. 19 is a view illustrating an example of an image captured by the first camera 36 or the second cameras 37. As illustrated in FIG. 19, when a person is included in the images indicated by the first image data or the second image data, the controller 27 recognizes and detects a person in the images. In step S105, the controller 27 determines whether the presence of a person in the periphery of the wok machine 1 is detected. When the presence of a person is not detected, the processing proceeds to step S106.

Figure 11:
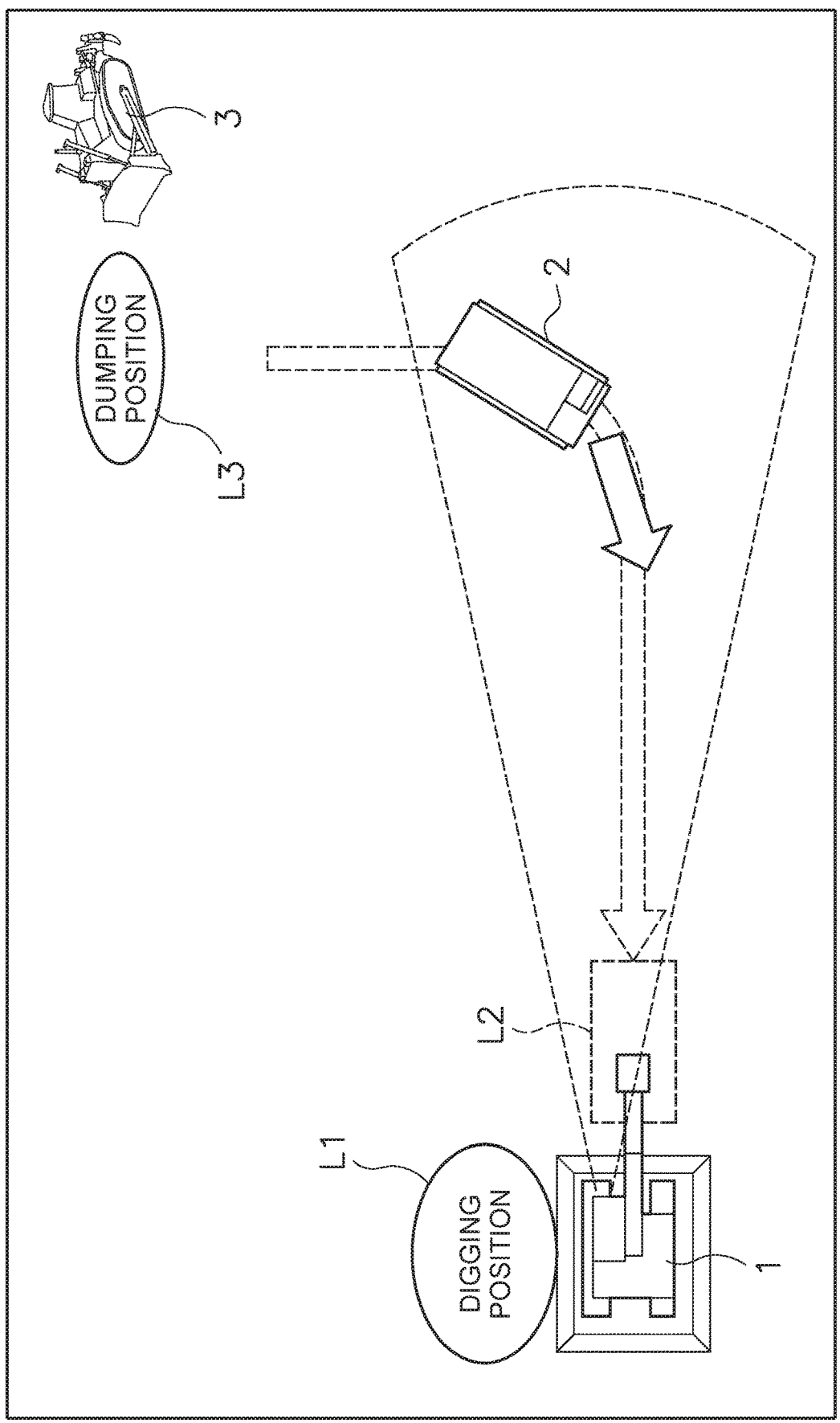
FIG. 11 is a plan view schematically illustrating conditions of the work site during the automatic control mode.

In step S106, the controller 27 executes image processing 2. In the image processing 2, the controller 27 detects the presence of the conveyance vehicle 2 with the image recognition technology based on the first image data. Therefore, the first camera 36 corresponds to a vehicle detection device that detects an approach of the conveyance vehicle 2 toward the work machine 1. The image recognition technology is the same as in step S104. As illustrated in FIG. 11, the controller 27 detects the presence of the conveyance vehicle 2 when the conveyance vehicle 2 has reached the image capturing range of the first camera 36.

Figure 20:
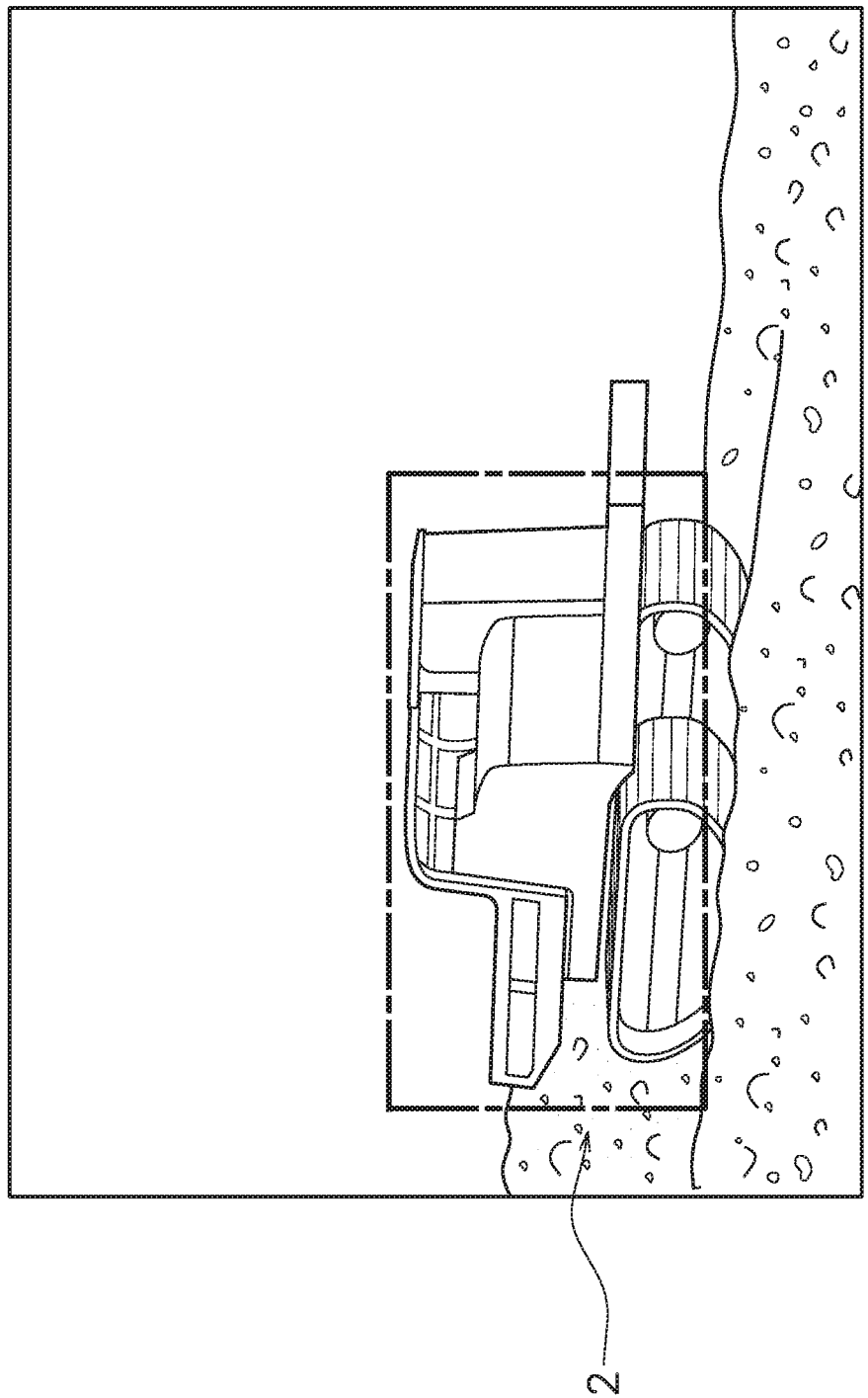
FIG. 20 is a view illustrating an example of an image captured by the first camera.

FIG. 20 is a view illustrating an example of an image captured by the first camera 36 when the conveyance vehicle 2 has reached the image capturing range of the first camera. As illustrated in FIG. 20, when the conveyance vehicle 2 is included in the images indicated by the first image data, the controller 27 recognizes and detects the conveyance vehicle 2 in the images.

In step S107, the controller 27 communicates with the conveyance vehicle 2. Here, the controller 27 receives the position data of the conveyance vehicle 2 from the conveyance vehicle 2 via the communication device 38. The controller 27 also receives the bed data and the rotation angle data from the conveyance vehicle 2 via the communication device 38.

In step S108, the controller 27 determines whether the approach of the conveyance vehicle 2 is detected. The controller 27 determines that the approach of the conveyance vehicle 2 is detected when the distance from the work machine 1 to the conveyance vehicle 2 is equal to or less than a predetermined threshold. The controller 27 calculates the distance from the work machine 1 to the conveyance vehicle 2 by analyzing the first image data. Alternatively, the controller 27 may calculate the distance from the work machine 1 to the conveyance vehicle 2 from the position data of the work machine 1 and the position data of the conveyance vehicle 2. When the approach of the conveyance vehicle 2 is detected, the processing proceeds to step S201 illustrated in FIG. 7. That is, the controller 27 causes the automatic control mode to transition from the standby mode to the loading mode.

The fact that no person is detected in step S105 and the fact that the approach of the conveyance vehicle 2 is detected in step S108 represent the transition condition for causing the automatic control mode to transition from the standby mode to the loading mode. The controller 27 causes the automatic control mode to transition from the standby mode to the loading mode when the transition condition is satisfied. The controller 27 does not cause the automatic control mode to transition from the standby mode to the loading mode and maintains the standby mode when the transition condition is not satisfied. The transition condition may also include other conditions.

When the controller 27 does not detect the approach of the conveyance vehicle 2 in step S108, the processing proceeds to step S109. In step S109, the controller 27 determines whether a finishing signal is received. The finishing signal is transmitted from the remote computer apparatus 4. The finishing signal is transmitted from the remote computer apparatus 4 to the controller 27 due to the operator operating the input device 402. Upon receiving the finishing signal, the controller 27 finishes the automatic control mode. When the automatic control mode is finished, the controller 27 stops the engine 24 of the work machine 1. In addition, the controller 61 of the conveyance vehicle 2 stops the conveyance vehicle 2 upon receiving the finishing signal.

Figure 12:
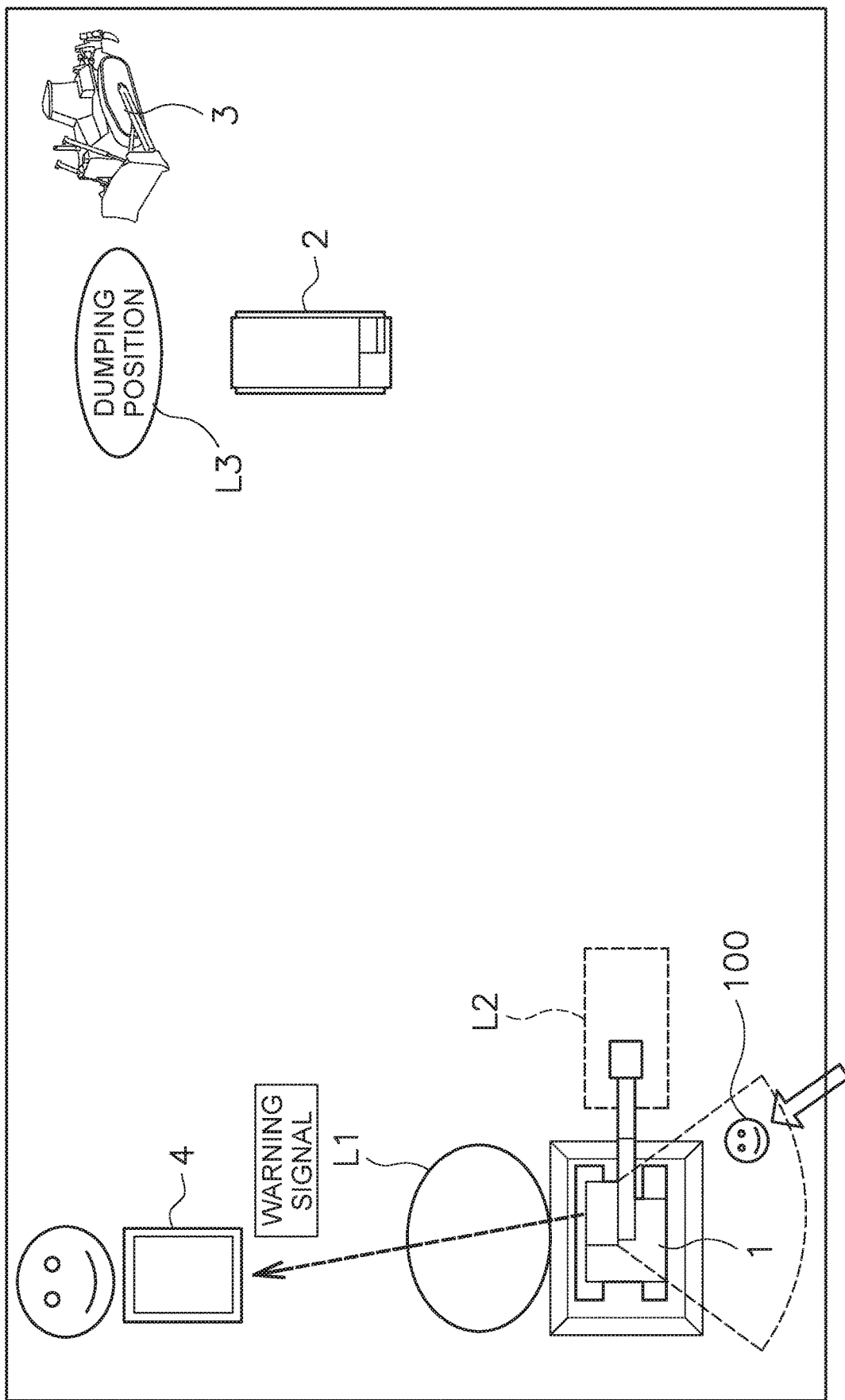
FIG. 12 is a plan view schematically illustrating conditions of the work site during the automatic control mode.

As illustrated in FIG. 12, when a person 100 has intruded into the periphery of the work machine 1, the controller 27 detects the presence of the person 100 in step S105. When the controller 27 detects the presence of the person 100, the processing proceeds to step S110. In step S110, the controller 27 outputs a warning signal so as to cause an output device to output a warning. In the present embodiment, the output device is the remote computer apparatus 4. Upon receiving the warning signal, the remote computer apparatus 4 displays a message or an image indicative of the warning on the display 401. The remote computer apparatus 4 may output a sound which represents the warning upon receiving the warning signal.

The output device is not limited to the remote computer apparatus 4 and may be another device. For example, the output device may be a warning lamp or a loudspeaker attached to the work machine 1 or disposed on the outside of the work machine 1. The controller 27 may output a command signal so as to illuminate the warning lamp or emit a warning sound from the loudspeaker when the presence of a person is detected.

The controller 27 determines whether the finishing signal is received in step S109 after causing the output device to output the warning signal in step S110. When the finishing signal is received, the controller 27 stops the automatic control mode. When the finishing signal is not received, the controller 27 maintains the automatic control mode in the standby mode.

When detecting the presence of a person in the periphery of the work machine 1 in the standby mode, the controller 27 does not transition the automatic control mode to the loading mode and maintains the standby mode even when detecting the approach of the conveyance vehicle 2. When detecting the presence of a person during the loading mode described later, the controller 27 stops the operations of the work implement 12 and the rotating body 13. In addition, when detecting the presence of a person, the controller 27 may transmit a command signal to stop the conveyance vehicle 2 to the controller 61 of the conveyance vehicle 2 in either of the standby mode or the loading mode.

Next, the processing in the loading mode will be explained. In the loading mode, the controller 27 performs digging by the work implement 12 at the predetermined digging position L1, causes the work implement 12 to rotate with the rotating body 13 from the digging position L1 toward the loading position L2, and unloads the materials from the work implement 12 at the loading position L2 to perform the loading work.

Figure 13:
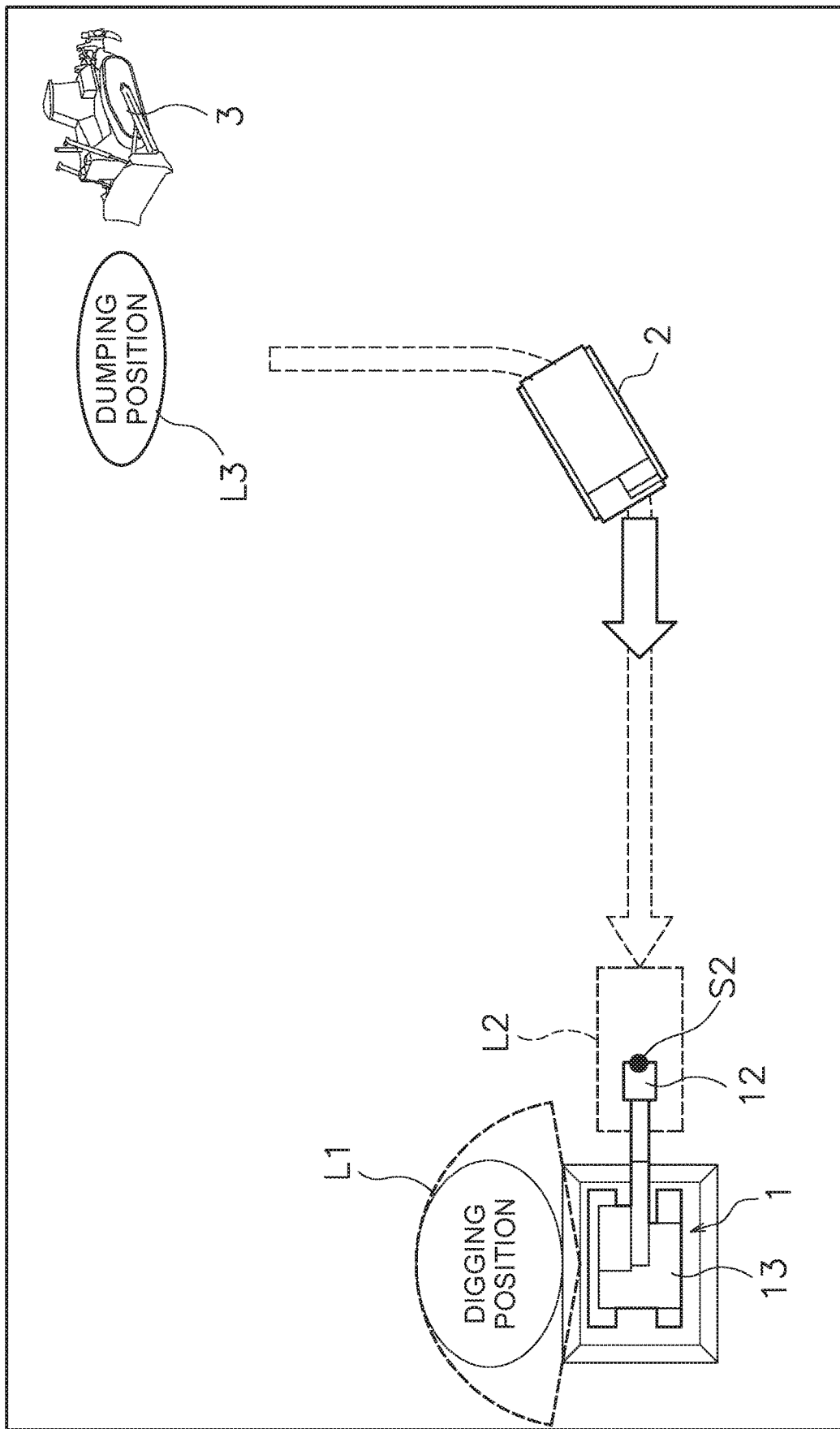
FIG. 13 a plan view schematically illustrating conditions of the work site during the automatic control mode.

As illustrated in FIG. 7, in the loading mode, the controller 27 measures a topography in step S201. Here, as illustrated in FIG. 13, the topography sensor 35 measures the topography of the digging position L1 located on a side of the work machine 1. The controller 27 acquires topography data indicative of the topography of the digging position L1 measured by the topography sensor 35. The controller 27 determines whether the rotating body 13 is stopped or operating, and when determining that the rotating body 13 is stopped, the controller 27 may measure the topography by the topography sensor 35.

Figure 21:
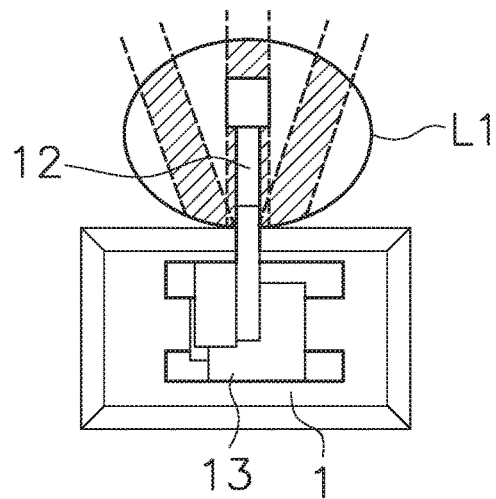
FIG. 21 is a diagram illustrating the extent of materials that can be dug by the work machine at the current position.

In step S202, the controller 27 determines whether the digging amount can be secured. Here, the controller 27 determines whether the materials of a predetermined amount or more can be acquired by digging when the work implement 12 and the rotating body 13 are operated at the current position of the work machine 1. For example, as illustrated in FIG. 21, the controller 27 calculates the amount of the materials that can be dug at the current position from the trajectory of the work implement 12 when the work implement 12 and the rotating body 13 are operated at the current position of the work machine 1 and from the topography of the digging position L1 indicated by the topography data. In FIG. 21, hatching is applied to the extent that can be dug when the work implement 12 is operated. The controller 27 determines that the digging amount can be secured when the amount of the materials that can be dug is equal to or greater than a predetermined threshold. When the controller 27 determines that the digging amount cannot be secured, the processing proceeds to step S203.

In step S203, the controller 27 adjusts the position of the work machine 1. For example, the controller 27 causes the work machine 1 to move forward or backward a predetermined distance. Then, the controller 27 measures the topography again in step S201 and determines whether the digging amount can be secured in step S202.

When the controller 27 determines that the digging amount can be secured in step S202, the processing proceeds to step S204. In step S204, the controller 27 calculates the weight (referred to below as "possible loading weight") of the materials that can be loaded hereafter onto the conveyance vehicle. The controller 27 stores the maximum load weight of the materials that can be loaded onto the conveyance vehicle 2. The controller 27 calculates the possible loading weight on the basis of the maximum load weight and the weight (referred to below as "loaded weight") of the materials already loaded onto the conveyance vehicle 2.

As discussed below, the controller 27 is able to calculate the weight of the held materials in the bucket 19 due to the digging, and the controller 27 calculates the weight of the materials in the bucket 19 at each unloading onto the conveyance vehicle 2, whereby the controller 27 is able to understand the loading amount onto the conveyance vehicle 2. The loading amount onto the conveyance vehicle 2 is zero at the time of the first digging.

Figure 22:
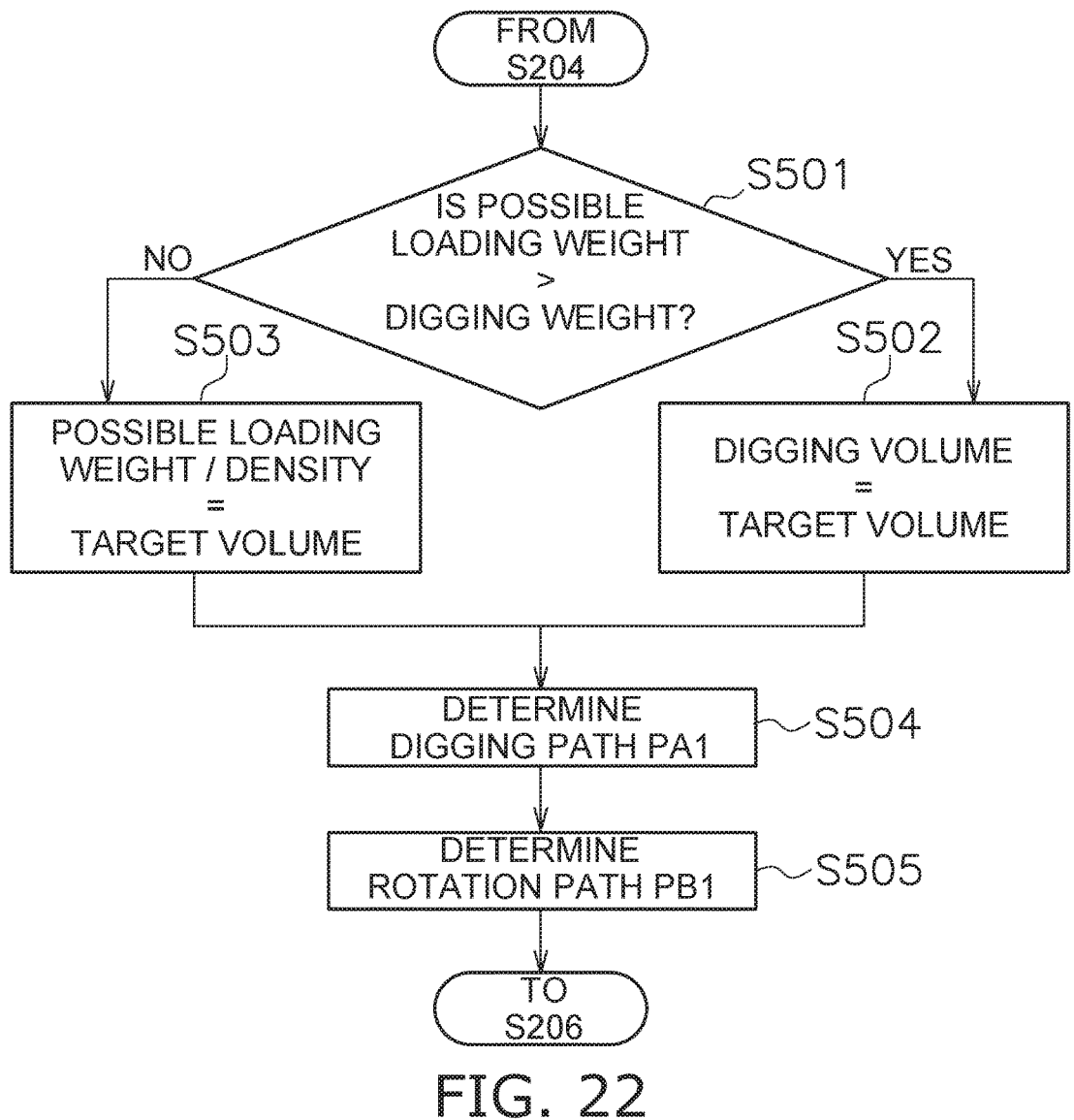
FIG. 22 is a flow chart illustrating processes for a digging plan.

In step S205, the controller 27 establishes a digging plan. FIG. 22 is a flow chart illustrating processing for the digging plan by the controller 27.

In step S501, the controller 27 determines whether the weight (referred to below as "digging weight") of the materials that can be dug at one time with the bucket 19 is greater than the possible loading weight. The controller 27 stores the volume (referred to below as "digging volume") of the materials that can be dug at one time with the bucket 19. The controller 27 calculates the density (example of a soil quality) of the materials as discussed below, and calculates the digging weight by multiplying the digging volume by the density of the materials. The density may be a predetermined initial value when the digging is executed the first time.

In step S501, if the controller 27 determines that the possible loading weight is greater than the digging weight, the processing advances to step S502. In step S502, the controller 27 sets the digging volume as a target volume. The target volume is the volume of the materials to be carried by the work implement 12.

In step S501, if the controller 27 determines that the possible loading weight is not greater than the digging weight, the processing advances to step S503. In step S503, the controller 27 sets a value derived by dividing the possible loading weight by the density of the materials, as the target volume.

In step S504, the controller 27 determines a digging path PA1 from the current position of the work machine 1, the topographical data, and the target volume. The digging path PA1 is a target digging trajectory of the blade tip of the work implement 12. The controller 27 determines the digging path PA1 from the current position of the work machine 1 and the topographical data so that the amount of materials to be dug with the work implement 12 matches the target volume.

Figure 23:
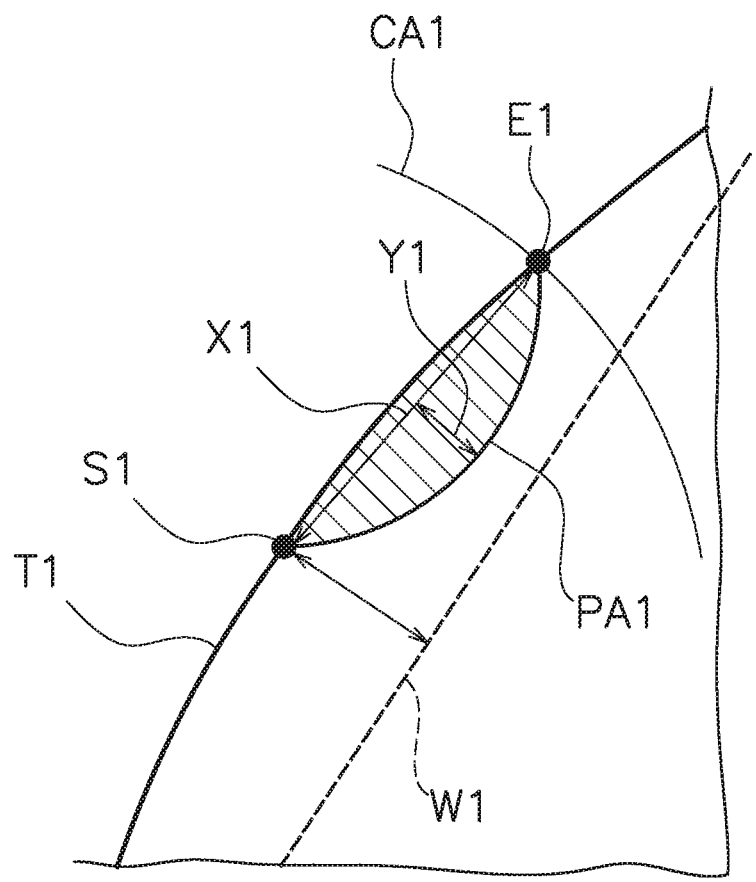
FIG. 23 is a diagram illustrating an example of a cross section of the current topography and a digging path.

FIG. 23 illustrates an example of a section of a current topography T1 and the digging path PA1. The controller 27 stores target topographical data which indicates a target topography W1 of the current topography T1 which is the work object. The current topography T1 can be acquired by the topography sensor 35. Alternatively, a straight line that passes through the top part of the current topography T1 and has a predetermined angle (for example, an angle of repose) with respect to a horizontal plane, may be used as the target topography W1.

The controller 27 determines a digging start point S1 on the basis of the target topography W1 and the current topography T1. For example, the controller 27 sets a position within the current topography T1 and that is separated by the greatest amount from the target topography W1 in a direction perpendicular to the target topography W1, as the digging start point S1. Next, the controller 27 sets an intersection of an arc CA1 of a radius X1 centered on the digging start point S1, and the current topography T1, as a digging end point E1. Next, a depth Y1 corresponding to a length X1 is derived by multiplying the radius X1 by a predetermined ratio. The controller 27 then sets, as the digging path PA1, an arc defined by the radius X1 and the depth Y1 and with which the volume (shaded portion in FIG. 23) between the surface of the current topography T1 and the arc matches the target volume. The predetermined ratio for deriving the depth Y1 can be set in advance to a value in which the digging efficiency is maximized based on a simulation result. The digging path PA1 includes the digging start point S1 and the digging end point E1. The digging start point S1 and the digging end point E1 are intersections between the surface of the topography T1 and the digging path PA1.

Figure 24:
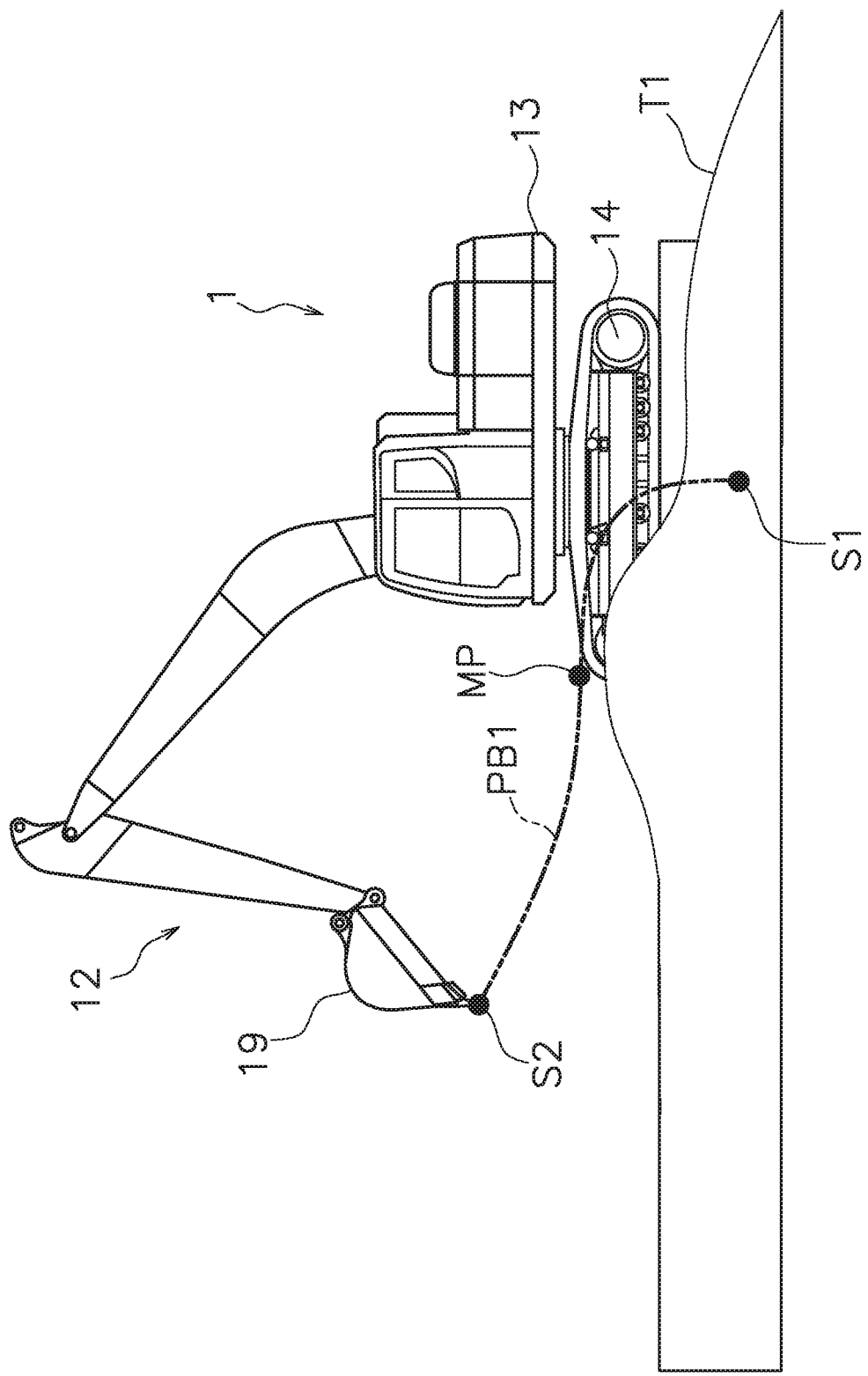
FIG. 24 is a side view of the work machine and the digging position from the X direction in FIG. 14.

In step S505, the controller 27 determines, on the basis of the topographical data, a rotation path PB1 which joins the position (referred to below as "current position S2") of the blade tip of the work implement 12 in the unloaded waiting orientation to the digging start point S1. The rotation path PB1 is a target rotation trajectory of the blade tip of the work implement 12. FIG. 24 is a side view of the work machine 1 and the digging position L1 from the X direction in FIG.

14. The controller 27 determines the rotation path PB1 so that the blade tip of the work implement 12 does not touch the current topography T1. The rotation path PB1 includes the digging start point S1, a midpoint MP, and the current position S2. The midpoint MP is set, for example, as a point a certain height above the topography T1 in the segment between the digging start point S1 and the current position S2. A plurality of midpoints MP may be set in accordance with the shape of the topography T1.

The controller 27 determines a rotation angle TA1 (referred to below as "target rotation angle") of the rotating body 13 required for moving the blade tip of the work implement 12 from the current position S2 to the digging start point S1 on the basis of the current position S2 and the digging start point S1.

The processing (step S205) of the digging plan based on the aforementioned steps S501 to S505 is completed, and the processing advances to step S206.

Figure 14:
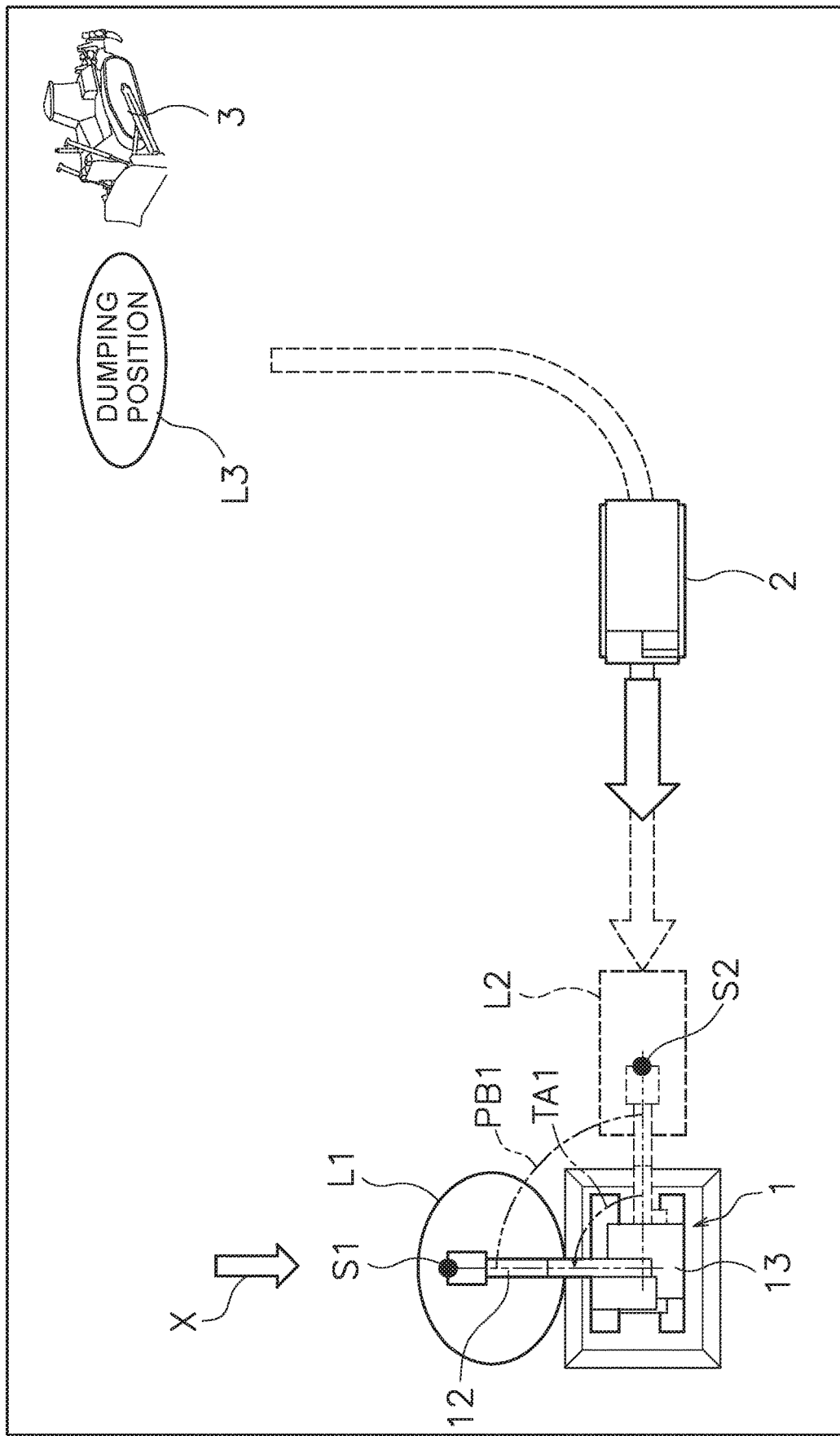
FIG. 14 is a plan view schematically illustrating conditions of the work site during the automatic control mode.

In step S206, the controller 27 executes an automatic down rotation. As illustrated in FIG. 14, the controller 27 controls the work implement 12 and the rotating body 13 so that the blade tip of the work implement 12 moves along the rotation path PB1 determined in the digging plan. Specifically, the controller 27 causes the blade tip of the work implement 12 to move from the current position S2 to the digging start point 51 while rotating the rotating body 13 by the target rotation angle TA1 and operating the work implement 12.

In step S207, the controller 27 executes automatic digging. Here, the controller 27 controls the work implement 12 so that the blade tip of the work implement 12 moves along the digging path PA1 determined in the digging plan.

In step S208, the controller 27 modifies the position data of the work machine 1. Here, the controller 27 reacquires the position data of the work machine 1, the attitude data of the work implement 12, and the rotation angle data from the position sensor 33, the work implement sensors 34a to 34c, and the rotation angle sensor 39, respectively, and modifies the position of the work machine 1 acquired in step S102.

In step S209, the controller 27 establishes an unloading plan. Here, the controller 27 determines a target rotation angle TA2 and an unloading position P1 from the current position of the work machine 1 and the bed position of the conveyance vehicle 2. The unloading position P1 indicates the position of the blade tip of the work implement 12 in the unloading waiting attitude. The bed position of the conveyance vehicle 2 indicates the position of the bed 53 while the conveyance vehicle 2 is positioned at the loading position L2. The controller 27 may store a predetermined bed position. Alternatively, the controller 27 may calculate the bed position from the loading position L2 and the vehicle dimension data of the conveyance vehicle 2. The controller 27 determines the unloading position P1 so that the work implement 12 faces toward the bed 53 and the blade tip is positioned a predetermined distance above the bed 53.

Figure 15:
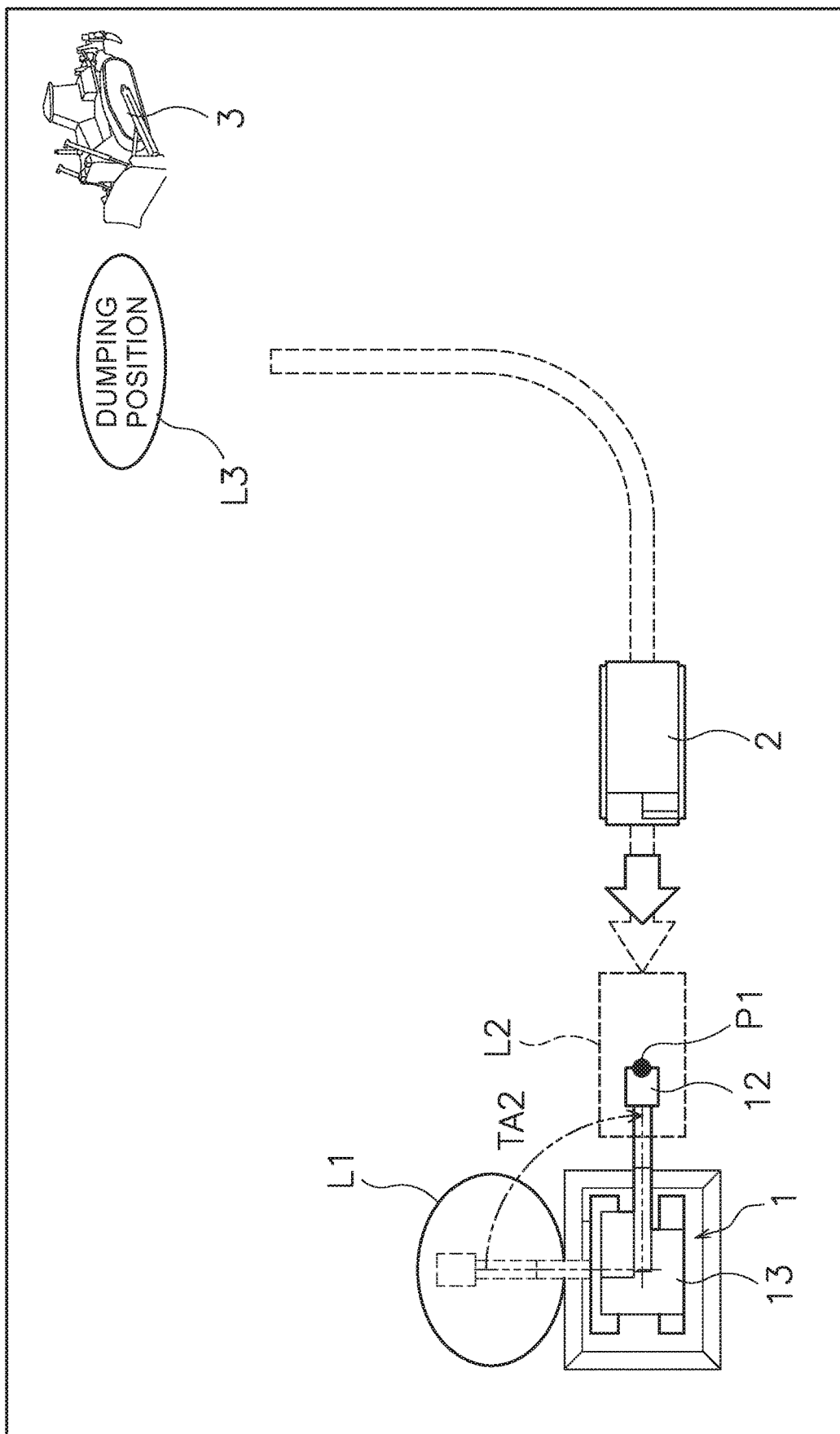
FIG. 15 is a plan view schematically illustrating conditions of the work site during the automatic control mode.

In step S210, the controller 27 executes an automatic hoist rotation. Here, as illustrated in FIG. 15, the controller 27 causes the rotating body 13 to rotate toward the unloading position P1 by the target rotation angle TA2, and causes the blade tip of the work implement 12 to be raised toward the unloading position P1.

In step S211, the controller 27 measures the weight of the materials dug by the work implement 12 and held by the bucket 19. The controller 27 acquires load data which indicates the load applied to the work implement 12 from the load sensors 32a to 32c. The controller 27 is able to acquire the weight of the materials held by the bucket 19. Alternatively, the controller 27 may acquire the weight of the materials held by the bucket 19 only on the basis of the load data received from the load sensor 32a that detects the load applied to the boom cylinder 21 among the load sensors 32a to 32c.

The controller 27 also calculates the density of the materials from the topographical data before the digging, the digging path PA1, and the weight of the materials held by the bucket 19. Therefore, the controller 27 calculates the volume of the materials dug by the work implement 12 from the topographical data before digging and from the digging path PAL The controller 27 calculates the density of the materials by dividing the weight of the materials by the calculated volume of the materials.

In step S301 illustrated in FIG. 8, the controller 27 determines a state of the work machine 1. Here, the controller 27 determines whether the work machine 1 is operating or stopped. The controller 27 determines that the work machine 1 is operating when at least one of the traveling body 14, the rotating body 13, and the work implement 12 is operating. The controller 27 determines that the work machine 1 is stopped when the blade tip of the work implement 12 reaches the unloading position P1 and all the traveling body 14, the rotating body 13, and the work implement 12 are stopped. Alternatively, the controller 27 may determine that the work machine 1 is stopped when the rotating body 13 and the traveling body 14 are stopped.

When the work machine 1 is stopped, the controller 27 executes image processing 3 in step S302. In the image processing 3, the controller 27 detects the conveyance vehicle 2 with image recognition technology based on the first image data. In addition, the controller 27 communicates with the conveyance vehicle 2 in step S303. Here, the controller 27 receives the position data, the bed data, and the rotation angle data of the conveyance vehicle 2 via the communication device 38 in the same way as in step S107.

Figure 16:
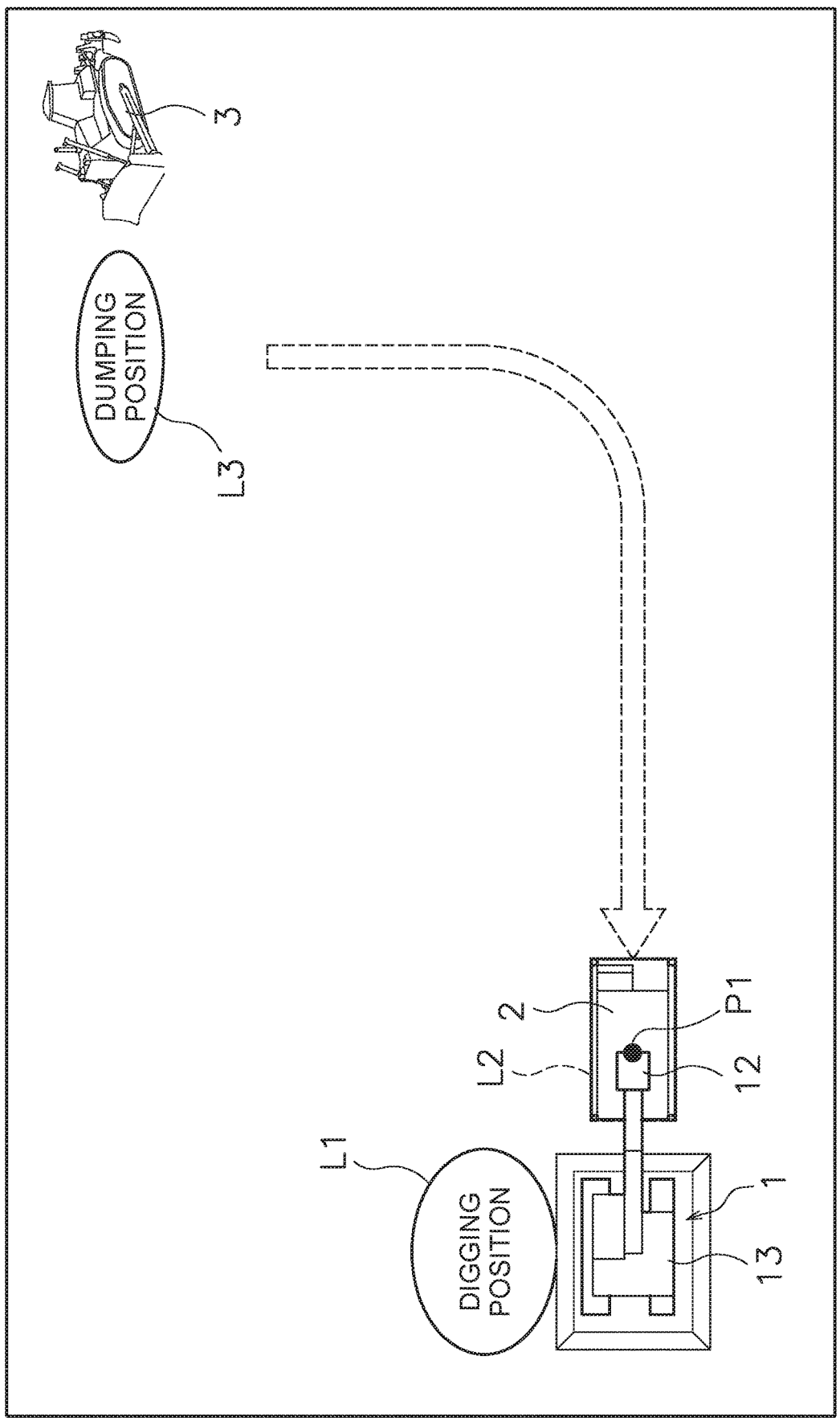
FIG. 16 is a plan view schematically illustrating conditions of the work site during the automatic control mode.

In step S304, the controller 27 then determines a state of the conveyance vehicle 2. Here, the controller 27 determines whether the conveyance vehicle 2 is operating or stopped at the loading position L2. The controller 27 determines that the conveyance vehicle 2 is operating when the conveyance vehicle 2 is traveling or when the bed 53 is rotating. The controller 27 determines that the conveyance vehicle 2 is stopped when the conveyance vehicle 2 is stopped at the loading position L2 as illustrated in FIG. 16 and the bed 53 is not rotating and is stopped.

When the work machine 1 is stopped in step S301, the controller 27 determines a state of the conveyance vehicle 2 based on the image processing 3 and the position data of the conveyance vehicle 2 in step S304. Therefore, the first camera 36 and the position sensor 63 correspond to a detection device that detects the operation of the conveyance vehicle 2. The controller 27 determines whether the conveyance vehicle 2 is stopped based on the first image data. Further, the controller 27 determines whether the conveyance vehicle 2 is stopped based on the position data of the conveyance vehicle 2. That is, the first image data and the position data of the conveyance vehicle 2 correspond to operation data indicative of the operation of the conveyance vehicle 2.

For example, the controller 27 may determine that the conveyance vehicle 2 is stopped when the stop of the conveyance vehicle 2 is detected based on both the image processing 3 and the position data of the conveyance vehicle 2. The controller 27 may determine that the conveyance vehicle 2 is operating when the operation of the conveyance vehicle 2 is detected based on at least one of the image processing 3 and the position data of the conveyance vehicle 2.

When the work machine 1 is operating in step S301, the controller 27 acquires the position data of the conveyance vehicle 2 in step S305, and determines a state of the conveyance vehicle 2 based on only the position data of the conveyance vehicle 2 in step 304.

When the conveyance vehicle 2 is operating in step 304, the processing returns to step S301. When the conveyance vehicle 2 is stopped in step 304, the processing proceeds to step S306. In step S306, the controller 27 executes image processing 4. In the image processing 4, the controller 27 detects the bed position of the conveyance vehicle 2 with image recognition technology based on the first image data.

Figure 25:
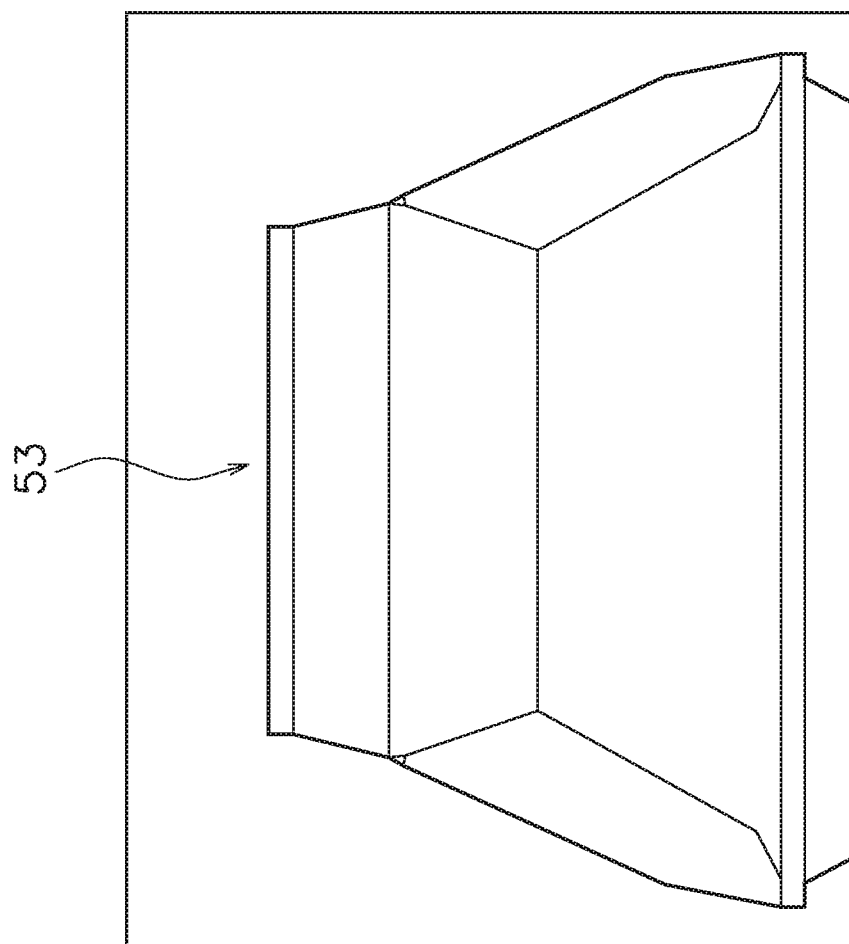
FIG. 25 is a view illustrating an example of an image captured by the first camera.

FIG. 25 is a view illustrating an example of an image captured by the first camera 36 when the conveyance vehicle 2 is stopped at the loading position L2. As illustrated in FIG. 25, the image indicated by the first image data includes the bed 53 of the conveyance vehicle 2. When the bed 53 is included in the image indicated by the first image data, the controller 27 recognizes the bed 53 in the image and detects the bed position.

In step S307, the controller 27 determines an error of the bed position. The controller 27 calculates a deviation between the bed position stored by the controller 27 and the bed position detected in step S306. The controller 27 determines that the error is large when the deviation is equal to or greater than a predetermined threshold. When the error of the bed position is large, the processing proceeds to step S308.

In step S308, the controller 27 modifies the unloading position P1. Here, the controller 27 modifies the unloading position P1 determined in step S209 based on the deviation calculated in step S307. When the error of the bed position is small in step S307, the unloading position P1 is not modified and the processing proceeds to step S309.

In step S309, the controller 27 executes automatic unloading. Here, the controller 27 operates the work implement 12 so as to unload the materials held by the bucket 19 onto the bed 53. In step S310, the controller 27 updates the bed position. The controller 27 updates the stored bed position to the bed position detected in step S306.

In step S401 illustrated in FIG. 9, the controller 27 determines whether the loading is finished. The controller 27 determines that the loading is finished when the loaded weight of the materials loaded onto the bed 53 reaches the maximum loading weight. The controller 27 calculates the loading amount from the load data. Specifically, the controller 27 calculates the weight of the dug materials from the load data. The controller 27 calculates the total value of the weight of the materials loaded onto the bed 53 as the loading amount.

When the controller 27 determines that the loading is not finished in step S401, the processing returns to step S201. The processing from step S201 to step S211 and the processing from step S301 to step S310 is repeated. Consequently, the material digging and loading onto the conveyance vehicle 2 are repeated.

Even when the second and subsequent digging are performed, the controller 27 performs again the measurement of the topography performed in step S201 and updates the topography data with new topography data acquired by the topography sensor 35. In addition, the controller 27 performs again the measurement of the weight of the materials in step S211, and calculates and updates the density of the materials from the newly measured weight and volume of the materials.

Figure 17:
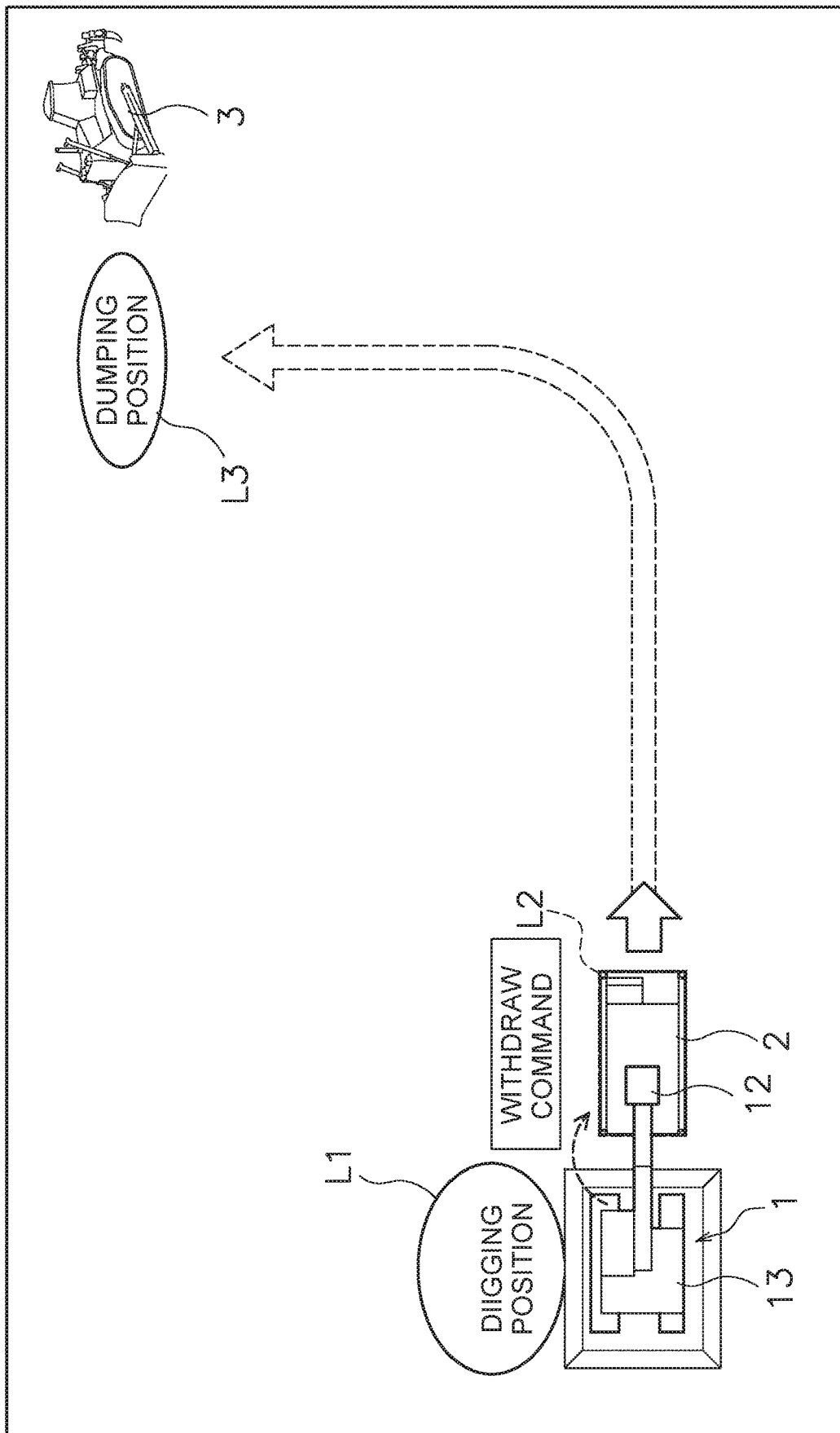
FIG. 17 is a plan view schematically illustrating conditions of the work site during the automatic control mode.

In step S401, when the controller 27 determines that the loading is finished, the processing proceeds to step S402. In step S402, as illustrated in FIG. 17, the controller 27 transmits, to the conveyance vehicle 2, a withdraw command to withdraw from the loading position L2. Upon receiving the withdraw command, the conveyance vehicle 2 starts moving from the loading position L2 toward the dumping position L3.

In step S403, the controller 27 executes the image processing 2. In the image processing 2, the controller 27 detects the presence of the conveyance vehicle 2 in front of the rotating body 13 with image recognition technology based on the first image data in the same way as in step S106. Further, in step S404, the controller 27 communicates with the conveyance vehicle 2 and acquires the position data of the conveyance vehicle 2. Here, the controller 27 receives the position data of the conveyance vehicle 2 via the communication device 38 in the same way as in step S303 and step S305.

Figure 18:
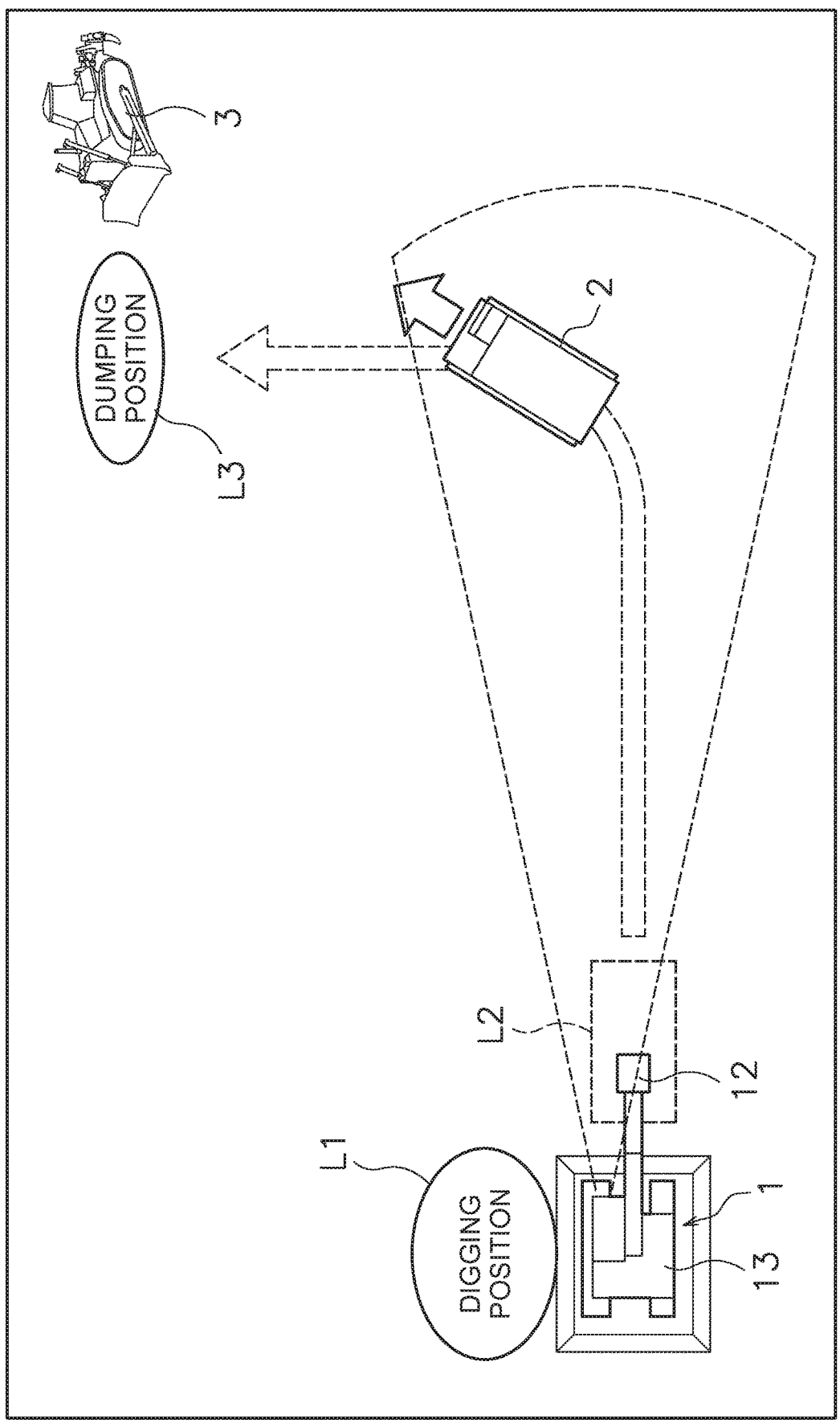
FIG. 18 is a plan view schematically illustrating conditions of the work site during the automatic control mode.

Next, in step S405, the controller 27 determines whether the withdrawal is completed. The controller 27 determines whether the withdrawal is completed based on the image processing 2 and the position data of the conveyance vehicle 2. As illustrated in FIG. 18, the controller 27 determines that the withdrawal is completed when it is detected that the conveyance vehicle 2 has moved away from the work machine 1 by a predetermined distance or greater.

For example, the controller 27 calculates the distance between the work machine 1 and the conveyance vehicle 2 based on the first image data. The controller 27 calculates the distance between the work machine 1 and the conveyance vehicle 2 based on the position data. The controller 27 may determine that the conveyance vehicle 2 has withdrawn from the loading position L2 when both the distance calculated from the first image data and the distance calculated from the position data are equal to or greater than a predetermined threshold. Alternatively, the controller 27 may determine that the conveyance vehicle 2 has withdrawn from the loading position L2 when at least one of the distance calculated from the first image data and the distance calculated from the position data is equal to or greater than a predetermined threshold.

When the controller 27 determines that the withdrawal is not completed in step S405, the processing returns to step S403. When the controller 27 determines that the withdrawal is completed in step S405, the processing returns to step S109. That is, when the controller 27 determines that the withdrawal is completed, the controller 27 finishes the loading mode and causes the automatic control mode to transition to the standby mode.

The controller 27 of the work machine 1 according to the present embodiment discussed above calculates the volume of the materials held by the bucket 19 on the basis of the topographical data and the digging path PA1, and calculates the density of the materials by dividing the weight of the materials by the calculated volume of the materials. Therefore, the density of the materials can be acquired easily and accurately because the volume of the materials can be calculated easily from the topographical data and the digging path PA1.

The controller 27 calculates the target volume of the materials to be carried by the work implement 12 on the basis of the possible loading weight of the materials that can be loaded onto the conveyance vehicle 2, and the density of the materials, and determines the next digging path PA1 on the basis of the calculated target volume and the topographical data. Therefore, the digging can be done with greater precision and efficiency.

Although an embodiment of the present invention has been described so far, the present invention is not limited to the above embodiment and various modifications may be made within the scope of the invention.

The work machine 1 is not limited to a hydraulic excavator and may be another machine such as a wheel loader, a motor grader, or the like. The configuration of the work machine 1 is not limited to that of the above embodiment and may be changed. The work machine 1 may be a vehicle driven by an electric motor. For example, the traveling body 14 and/or the rotating body 13 may be driven by an electric motor. The configuration of the work implement 12 may be changed. For example, the work implement 12 is not limited to the bucket 19 and may include another attachment such as a grapple, a fork, a lifting magnet, or the like.

The conveyance vehicle 2 may be a vehicle other than a dump truck. The configuration of the conveyance vehicle 2 is not limited to that of the above embodiment and may be changed. For example, the conveyance vehicle 2 may be a vehicle driven by an electric motor. For example, the traveling body 14 and/or the bed 53 may be driven by an electric motor. The bed 53 of the conveyance vehicle 2 may not be rotatable. The traveling body 52 of the conveyance vehicle 2 may be provided with tires instead of crawler belts. The conveyance vehicle 2 may not be under automatic control and may be manually driven by an operator.

The configurations of the sensors provided on the work machine 1 and the conveyance vehicle 2 are not limited to those of the above embodiment and may be changed. For example, the topography sensor 35 may be disposed in a part other than the side part of the rotating body 13. The topography sensor 35 is not limited to a LIDAR device and may be another sensing device such as a radar device or the like. Alternatively, the topography sensor 35 may be a camera and the controller 27 may recognize the topography by analyzing the images captured by the camera.

The first camera 36 may be disposed in a part other than the front part of the rotating body 13. The second cameras 37 may be disposed in parts other than both side parts and the rear part of the rotating body 13. The number of the second cameras is not limited to three and may be less than three or greater than three.

The controller 27 is not limited to one unit and may be divided into a plurality of controllers 27. The processing executed by the controller 27 may be distributed and executed among the plurality of controllers 27. In such a case, a portion of the plurality of controllers 27 may be disposed outside the work machine 1.

The controller 27 of the work machine 1 and the controller 61 of the conveyance vehicle 2 may not communicate with each other directly, and may communicate through another controller. The processing in the automatic control mode executed by the controller 27 is not limited to that of the above embodiment and may be changed. For example, the processing in the standby mode may be changed. The processing in the loading mode may be changed.

In the above embodiment, the controller 27 uses both the first image data and the position data of the conveyance vehicle 2 to determine the approach and the withdrawal of the conveyance vehicle 2. However, the controller 27 may use only one of the first image data and the position data of the conveyance vehicle 2 to determine the approach and/or the withdrawal of the conveyance vehicle 2.

In the above embodiment, the controller 27 uses both the first image data and the position data of the conveyance vehicle 2 to detect the position of the bed 53. However, the controller 27 may use only one of the first image data and the position data of the conveyance vehicle 2 to detect the position of the bed 53.

In the above embodiment, the controller 27 calculates the possible loading weight based on the load data detected by the load sensors 32a to 32c. However, the controller 27 may calculate the possible loading weight based on the image of the bed 53 indicated by the first image data. The controller 27 may detect the amount of the materials loaded onto the bed 53 from the image of the bed 53 indicated by the first image data to calculate the possible loading weight from the amount of the loaded materials.

In the above embodiment, the controller 27 determines the rotation path PB1 so as to join the current position S2 of the work implement 12 and the digging start point S1. However, the controller 27 may set a movement target position above the digging start point S1 and determine the rotation path PB1 so as to join the current position S2 and the movement target position. The distance between the digging start point S1 and the movement target position in the vertical direction may be previously set to a predetermined value (about 20 cm, for example). In this way, the return point of the rotation path PB1 is set to the movement target position offset from the digging start point S1 upward in the vertical direction, whereby any collision of the work implement 12 with an obstacle such as a rock can be limited.

While the volume of the materials in the bucket 19 is derived using the digging path PA1 as the target digging trajectory in the above embodiment, the present invention is not limited in this way. For example, the actual digging path may be calculated from the position of the bucket 19 (specifically, the blade tip) during the actual digging, and the volume of the materials in the bucket 19 may be calculated using the actual digging path. In this case, the controller 27 calculates the volume of the materials held by the bucket 19 on the basis of the topographical data and the actual digging path, and calculates the density of the materials by dividing the weight of the materials by the calculated volume of the materials.

While the controller 27 calculates the density of the materials as an example of the soil quality of the materials in order to determine the target volume of the materials in the above embodiment, the present invention is not limited in this way. The controller 27 may calculate at least one of the viscosity and the hardness of the materials in place of the density of the materials. The viscosity and the hardness of the materials can each be calculated on the basis of the difference between the digging path PA1 as the target digging trajectory and the actual digging path during the actual digging. The controller 27 can acquire the actual digging path on the basis of the position of the bucket 19 during the digging.

According to the present invention, the loading work by the work machine is performed with the automatic control and work efficiency is improved.

The invention claimed is:

1. A system for controlling a work machine that includes a work implement having a bucket, and a topography sensor configured to measure a topography, the system comprising:
   a controller configured
      to acquire a target digging path of the bucket and
      to determine a measured weight of materials held by the bucket, the controller being configured to calculate a volume of the materials held by the bucket, based on
topographical data indicative of the topography measured by the topography sensor, and
the target digging path, and
the controller being configured to calculate a density of the materials by dividing the measured weight of the materials by the calculated volume of the materials.

2. The system according to claim 1, wherein
the controller is further configured to calculate a target volume of the materials to be carried by the work implement, based on
a load weight of the materials that can be loaded onto the conveyance vehicle, and
the density of the materials, and
the controller is further configured to acquire the target digging path based on the calculated target volume and the topographical data.

3. The system according to claim 1, wherein
the controller is further configured to acquire the target digging path based on positions of the bucket during the digging.

4. The system according to claim 1, wherein
the controller is further configured to control the work implement so that the bucket moves along the target digging path.

5. A work machine comprising:
a work implement having a bucket;
a topography sensor configured to measure a topography; and
a controller configured
to determine a target digging path of the bucket based on topographical data indicative of the topography measured by the topography sensor, and
to acquire an actual digging path based on positions of the bucket during digging,
the controller being configured to calculate at least one of a viscosity and a hardness of materials based on a difference between the target digging path and the actual digging path.

6. A method executed by a controller in order to control a work machine, the method comprising:
acquiring topographical data indicative of a topography in a vicinity of the work machine;
acquiring a target digging path of a bucket of a work implement;
calculating a volume of materials held by the bucket, based on the target digging path and the topographical data;
measuring a weight of the materials held by the bucket; and
calculating a density of the materials by dividing the measured weight of the materials by the calculated volume of the materials.

* * * * *